(12) United States Patent
Bobanovic et al.

(10) Patent No.: US 8,289,620 B2
(45) Date of Patent: Oct. 16, 2012

(54) IMAGING

(75) Inventors: Fedja Bobanovic, Cambridge (GB); John Phillips, Cambridge (GB); Shab Ladha, Cambridge (GB); Patrick Courtney, Cambridge (GB)

(73) Assignee: PerkinElmer Singapore PTE Ltd., Singapore (SG)

( * ) Notice: Subject to any disclaimer, the term of this patent is extended or adjusted under 35 U.S.C. 154(b) by 1346 days.

(21) Appl. No.: 10/531,007

(22) PCT Filed: Oct. 15, 2003

(86) PCT No.: PCT/GB03/04486
§ 371 (c)(1), (2), (4) Date: Oct. 13, 2005

(87) PCT Pub. No.: WO2004/036898
PCT Pub. Date: Apr. 29, 2004

(65) Prior Publication Data
US 2006/0124870 A1    Jun. 15, 2006

(30) Foreign Application Priority Data

Oct. 16, 2002 (GB) .................................. 0224067.9

(51) Int. Cl.
*G02B 21/00* (2006.01)
(52) U.S. Cl. ........................ 359/368; 359/363; 359/385
(58) Field of Classification Search ........... 359/368–390
See application file for complete search history.

(56) References Cited

U.S. PATENT DOCUMENTS

| 4,972,258 A * | 11/1990 | Wolf et al. ...................... 348/79 |
| 5,067,805 A | 11/1991 | Corle |
| 5,633,751 A | 5/1997 | Tanaami |
| 5,936,764 A * | 8/1999 | Kobayashi .................... 359/385 |
| 6,122,396 A * | 9/2000 | King et al. .................... 382/133 |
| 6,144,028 A * | 11/2000 | Kley ............................. 250/234 |
| 6,191,885 B1 | 2/2001 | Kitagawa |
| 6,229,928 B1 | 5/2001 | Matsuzawa |

(Continued)

FOREIGN PATENT DOCUMENTS

GB    2369739 A    6/2002

(Continued)

OTHER PUBLICATIONS

Search report in GB 0325250.0, dated Feb. 2, 2004.

(Continued)

*Primary Examiner* — Thong Nguyen
(74) *Attorney, Agent, or Firm* — Barnes & Thornburg LLP

(57) ABSTRACT

A method of imaging light from a specimen in which excitation light passes to the specimen via a scanning system and light emitted by luminescence of the specimen passes in another direction via the scanning system to an image capture device having a sensor having discrete spatially distinct light sensitive regions. The scanning system is operated to scan the whole of an area of interest of the specimen, and the excitation light and/or the image capture device are controlled so that light emitted from the specimen in only incident on the image capture device sensor for a specific time period equal to that required for scanning the whole of the area of interest n time. The scanning system is a confocal system. Apparatus is provided for performing the method to produce a video signal for creating an image in a display device or for processing and analysis by a computer.

31 Claims, 15 Drawing Sheets

U.S. PATENT DOCUMENTS

| | | |
|---|---|---|
| 6,281,657 B1 | 8/2001 | Matsuo |
| 6,320,185 B1 | 11/2001 | Matsuo |
| 6,426,835 B1 * | 7/2002 | Endo et al. .................... 359/388 |
| 6,462,771 B1 | 10/2002 | Kitagawa |
| 2002/0018290 A1 | 2/2002 | Birk |
| 2002/0024026 A1 | 2/2002 | Kaushikkar |
| 2002/0036824 A1 | 3/2002 | Sasaki |
| 2002/0067477 A1 * | 6/2002 | Morita et al. ............... 356/237.5 |
| 2002/0097487 A1 * | 7/2002 | Arai ............................... 359/385 |
| 2002/0097490 A1 * | 7/2002 | Endo et al. .................... 359/388 |

FOREIGN PATENT DOCUMENTS

| | | |
|---|---|---|
| JP | 06-317526 | 11/1994 |
| JP | 09-043147 | 2/1997 |
| JP | 9080315 A | 3/1997 |
| JP | 09319408 A | 12/1997 |
| JP | 10-282426 | 10/1998 |
| JP | 11-096334 | 4/1999 |
| JP | 2000-275534 | 10/2000 |
| JP | 2000-275539 | 10/2000 |
| JP | 2000275542 A | 10/2000 |
| JP | 2001-091839 | 4/2001 |
| JP | 2001091843 A | 4/2001 |
| JP | 2002-055284 | 2/2002 |
| JP | 2002-090628 | 3/2002 |
| JP | 2002-199166 | 7/2002 |

OTHER PUBLICATIONS

Rowland, "Confocal Microscopy Opens the Door to 3-Dimensional Analysis of Cells", Bioscience, vol. 26, No. 3, Aug. 2000, pp. 3-7.

Callamaras, "Construction of a confocal microscope for real-time x-y and x-z imaging" Cell Calcium, vol. 26, No. 6, 1999, pp. 271-279.

Nikon Brochure, "Modular Confocal Microscope System", Jan. 2002, pp. 1-15.

Kawamura, "Confocal Laser Microscope Scanner and CCD Camera", Yokogawa Technical Report, No. 33, 2002, pp. 17-20.

* cited by examiner

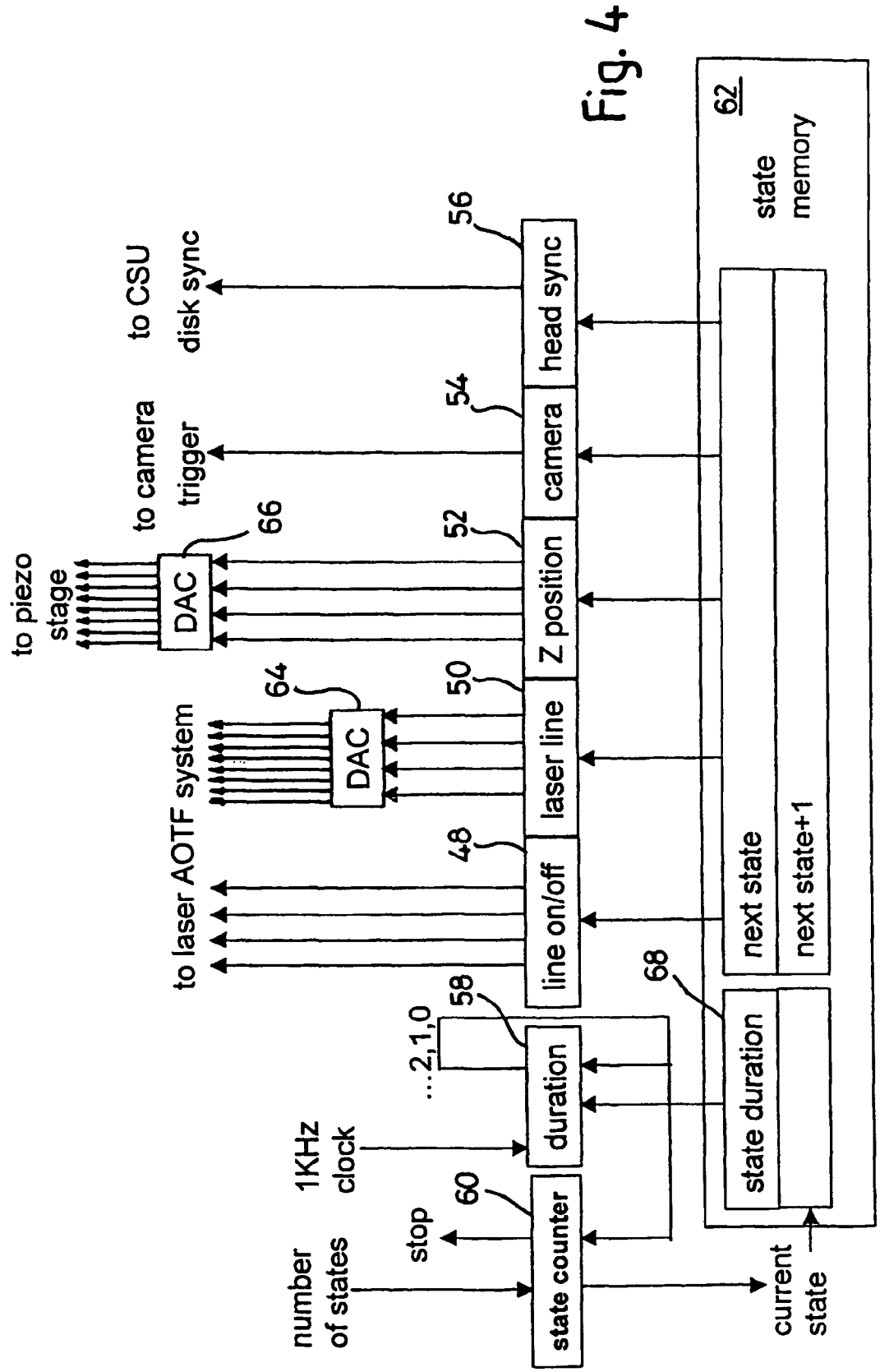

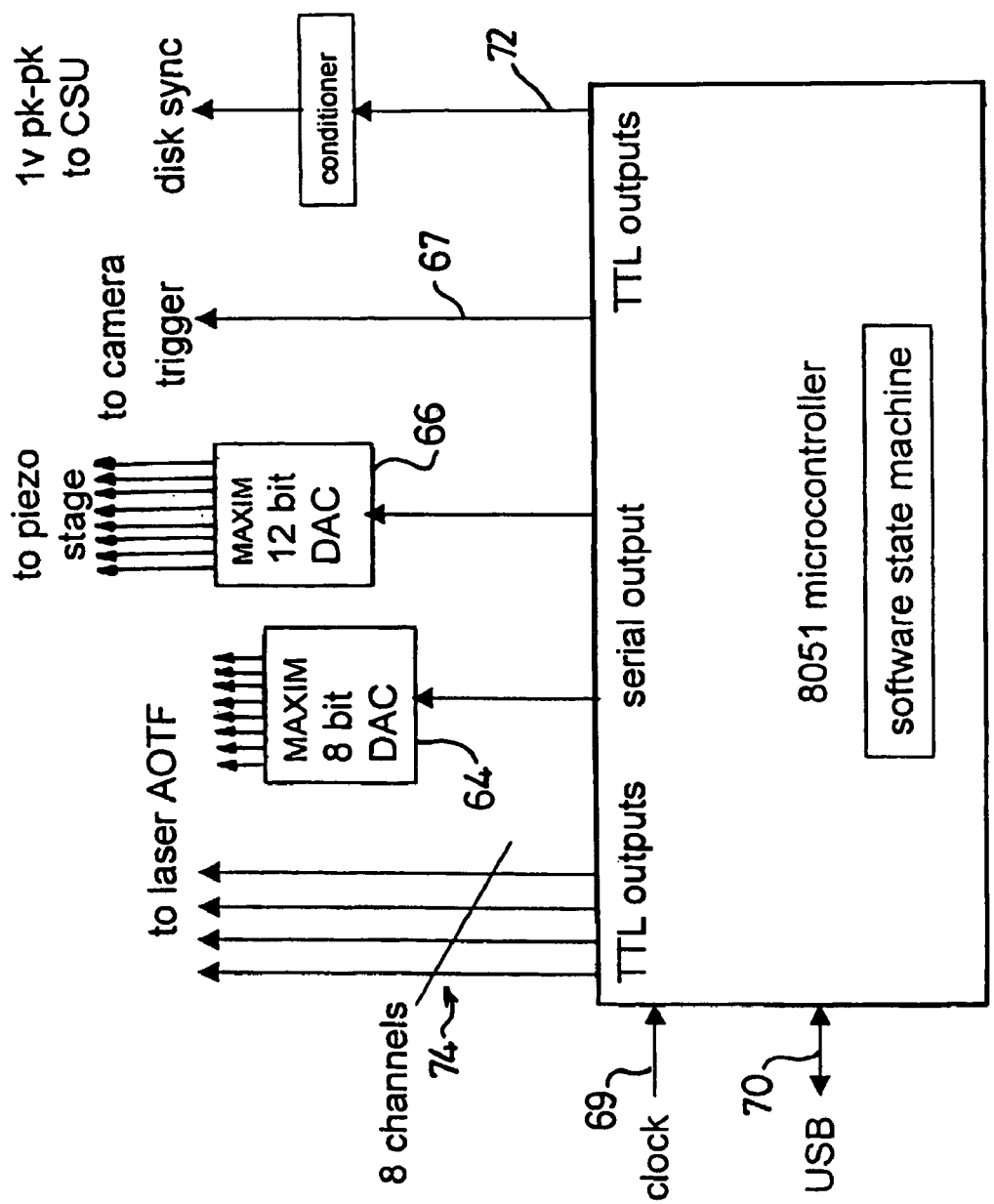

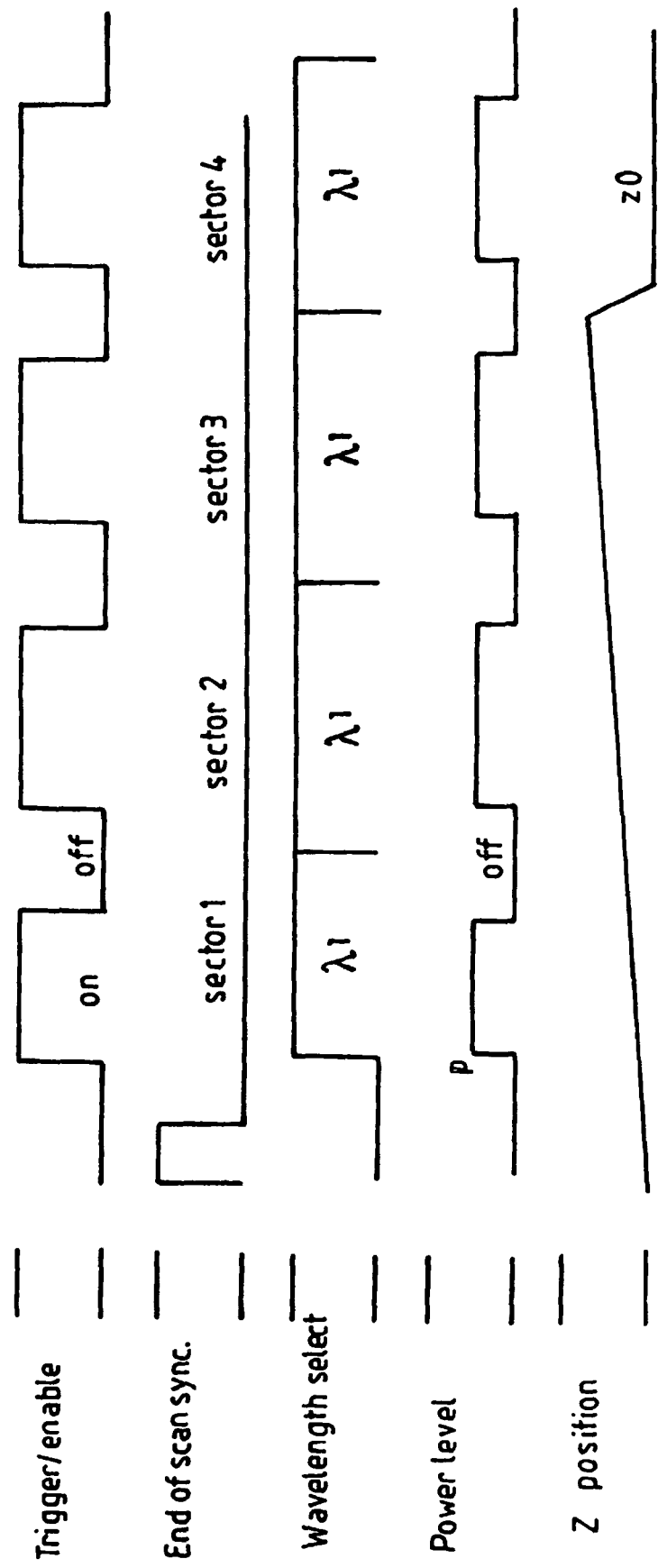

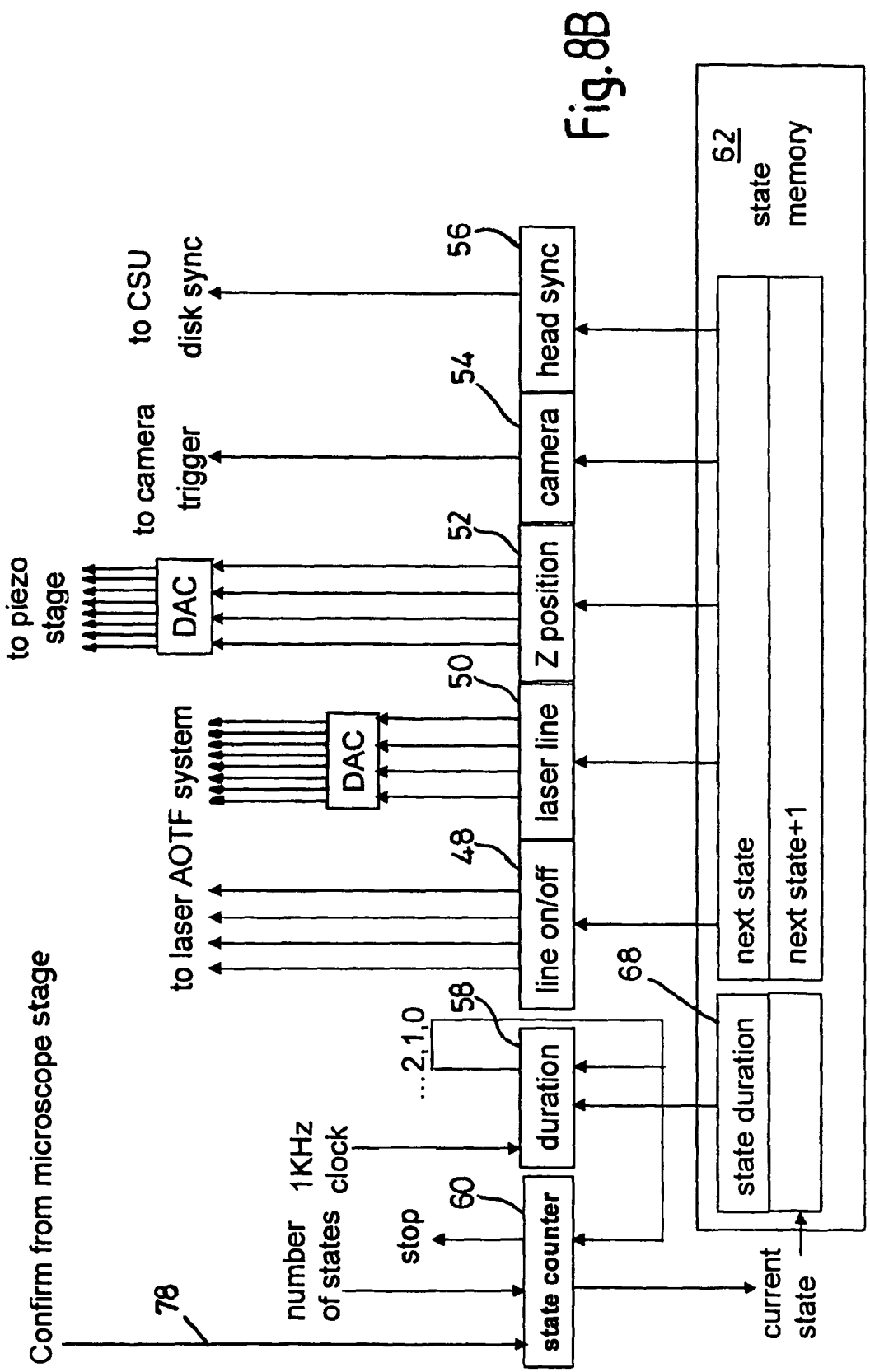

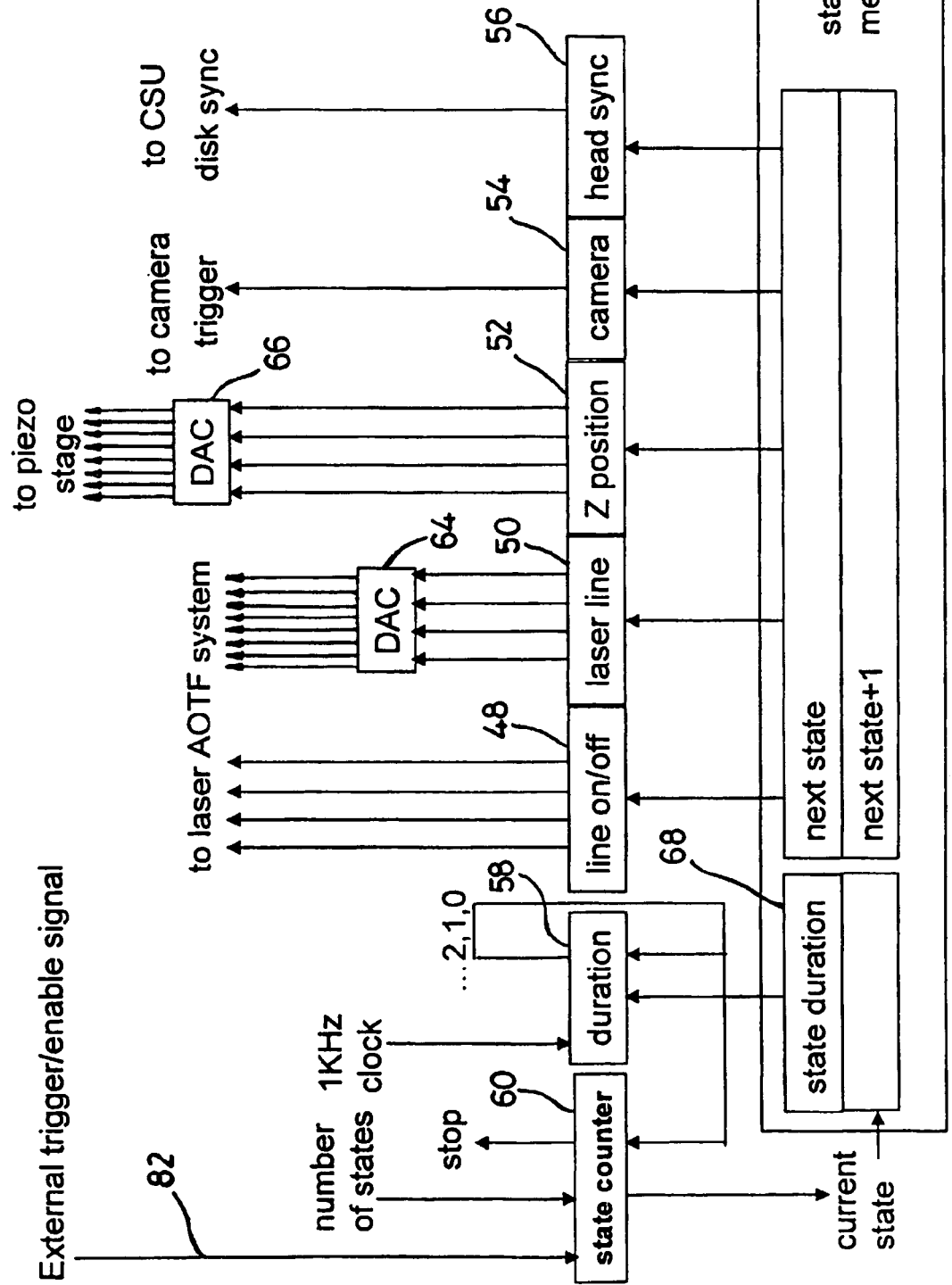

IMAGING

FIELD OF INVENTION

This invention concerns a method and apparatus by which luminescent elements of a specimen or sample can be imaged for analysis.

BACKGROUND

It is known to use laser excitation confocal imaging, a Nipkow disc scanner (which may be a microlens enhanced disc scanner) and a digital camera, to provide image data in two dimensions, and if controlled Z-axis movement is also provided, three dimensional image data can be obtained. Where a luminescent element is altering with time, a sequence of images can be obtained to provide data in four dimensions, (ie area, depth and time). Where possible, other parameters may also be changed or observed, including excitation wavelength, emission wavelength, polarisation, and/or emission lifetime.

One system which is capable of providing such data about microscopic specimens such as cells and tissue samples is the UltraVIEW live Cell Imager as produced and supplied by Perkin Elmer Life Sciences. This system uses a confocal laser microscope and CCD camera imaging system such as is described in a paper written by Kawamura Negishi Otsuki and Tomosada entitled Confocal Laser Microscope and CCD Camera, published in the Yokogawa Technical Report No. 33 (2002), English Edition and Yokogawa Patent No. EP 0539691 WO 9804946.

It is also known to use one or more lensless discs to achieve confocality as described in U.S. Pat. No. 6,147,798 to Atto. Here rotation of the lensless disc or discs correspond to the rotation of the Nipkow disc(s).

U.S. Pat. No. 5,248,876 and WO 03/019242 describe another confocal scanning process in which a fixed pattern of pinholes are employed to scan in a linear manner. One complete scan using the pinhole array corresponds to rotation of the Nipkow disc(s).

U.S. Pat. No. 5,034,613 (Denk) describes another process, known as a 2 photon process, to limit the focal plane of activation and achieve confocality. Here one pulse from the excitation source equates to rotation of the Nipkow disc(s).

Another pinhole-based confocal scanning system is described in 1998 Opt-Leth 23(9): 655-657 in a report entitled Multifocal Multiphoton Microscopy by Beresdorf et al. Here one complete scan using the pinholes corresponds to rotation of the Nipkow disc(s).

A further confocal scanning system is described in US 2002/024007, EP 0911667, U.S. Pat. No. 5,587,832 and U.S. Pat. No. 6,483,641/EP 1207415. This system employs a controllable array of mirrors to synthesise an array of pinholes. Again one complete scan of the pinholes corresponds to rotation of the Nipkow disc(s).

Lastly transmission and reflective elements arranged in a random or quasi-random pattern can be used for confocal scanning as described in WO 97/31282 and WO 0043819 (Wilson et al). Again one complete scan of the transmission and reflective elements corresponds to the rotation of the Nipkow disc(s).

It is an object of the present invention to provide an imaging system which is an improvement over the systems currently in use and in particular over the current UltraVIEW system, and that described in the aforementioned Yokogawa Technical Report No. 33 (2002) and related Patents EP 0539691 and WO 9804946, EP 1245986, U.S. Pat. No. 5,633,751 and U.S. Pat. No. 6,388,808.

It is also an object of the present invention to provide a control system for more accurately controlling the imaging and data capture process and a method of operation of such a system.

It is also an object of the present invention to provide an improved method of capturing light from luminescing elements in a sample or specimen and converting the captured light into data for processing for analysis and/or display and/or storage for subsequent display and/or processing for analysis.

SUMMARY OF THE INVENTION

According to one aspect of the present invention in a method of imaging light from a specimen in which excitation light passes to the specimen via a scanning system and light emitted by luminescence of the specimen passes in another direction via the scanning system to an image capture device having discrete spatially distinct light sensitive regions wherein the scanning system is operated so as to scan the whole of an area of interest of the specimen the excitation light and/or the image capture device are controlled so that light emitted from the specimen is only incident on the image capture device for a specific time period equal to that required for scanning the whole of the area of interest n times (where n is a whole number equal to or greater than 1).

The area of interest may be the whole of the viewable area of the specimen or a part thereof, and a window of variable size and location may be created by the scanning system to enable some or all of the area to be scanned, and for example a subarray of variable size and location may be used.

In a preferred arrangement the scanning system comprises a rotating a Nipkow disc scanner in which excitation light passes through openings in the disc in one direction and light emitted by luminescence of the specimen passes through the openings in the opposite direction to form an image at the image capture device, and the pattern of openings is such that rotation of the disc through A° results in scanning the whole of the area of interest and the specific time period is selected to correspond to nA° of rotation of the disc (where n is a whole number equal to or greater than one).

Conveniently the image capture device is a CCD camera.

A single Nipkow disc may be employed, but more preferably a 2-disc arrangement is employed, one containing openings and the other microlenses, as described in the Yokogawa Technical Report No. 33 (2002). References herein to a disc (or disc means or disc arrangement) are intended to include multiple disc assemblies such as described in that Report, as well as single disc arrangements, where the context so admits.

Alternatively one or more lensless discs may be used (for example as described in U.S. Pat. No. 6,147,798). In this case, the rotation of the lensless disc corresponds to rotation of the Nipkow disc.

Alternatively, light may be scanned using a linear process such as a raster scanning technique, using one pinhole, or several pinholes in a fixed pattern (for example as described in U.S. Pat. No. 5,248,876 also WO 03/019242) where one complete linear scan of the pinholes corresponds to rotation of the Nipkow disc.

Alternatively a scanning slit scanner may be used (for example as described in U.S. Pat. No. 6,038,076) where a scan of the slit corresponds to rotation of the Nipkow disc.

Alternatively, confocality may be achieved by a 2 photon process which limits the focal plane of activation (see as described in U.S. Pat. No. 5,034,613) where one pulse of the 2 photon excitation source corresponds to rotation of the Nipkow disc.

Alternatively confocality may be obtained by a time delay multiplexed process (as described by Bewersdorf, Pick and Hell in a paper entitled "Multifocal Multiphoton Microscope" 1998 Opt Lett. 23(9): 655-657) where one complete scan of the pinholes corresponds to rotation of the Nipkow disc.

Alternatively an array of independently controllable mirrors may be used to synthesise the pinholes (see for example EP 0911667 and US 2002,024007) where a complete scan using the mirrors, creates an image or subimage and corresponds to rotation of the Nipkow disc.

Alternatively a random or quasi random pattern on transmissive and reflective elements may be scanned (as described in WO 97/31282 and WO 0043819) where one complete scan of the transmissive and reflective elements corresponds to rotation of the Nipkow disc.

According to another aspect of the present invention, in a method of imaging light from a specimen using an image capture device comprising a sensor containing discrete spatially distinct light sensitive regions, a scanning device is employed by which light is prevented from reaching the specimen except from an excitation source for each of a succession of separated specific periods of time, the image capture device is read out at the end of each said period of time and is reset prior to the beginning of the next said time period, and light from the source of excitation light is supplied for a time precisely equal to each said specific period of time and thereafter is extinguished, so that the duration of the image capture device exposure is controlled by the time for which the excitation light source is active.

In one method embodying the invention the excitation light source is switched on and off to control the duration of the exposure.

Alternatively or additionally, shutter means may be provided to interrupt light from the excitation source except for when the specimen is to be scanned, and the excitation light source may be operated continuously or for longer periods of time than the said specific periods of time.

Alternatively or additionally an intrinsic (electronic) shutter may be used.

Alternatively or additionally a light chopper may be used to interrupt the excitation light.

Alternatively an acousto-optic light interrupting element may be used.

Shutter means may be provided between the scanning system and the image capture device to prevent light reaching all or part of the capture device sensor, except for the specific periods of time during which the excitation light is incident on the specimen, thereby to reduce errors which could arise from light arising from phosphorescence, afterglow, stray reflections or other effects, from reaching the device.

If shutter means is provided for both excitation source and image capture device, they are preferably synchronously operated such as by mechanical or electrical means, or electronic pseudo shutter means may be employed or any combination thereof.

Where the specimen is largely transparent it can be scanned and imaged at different spaced apart planes which are also preferably parallel to one another.

Multiple images may be collected over short periods of time (eg 1 minute-60 minutes) or extended periods of time (eg 24-72 hours) as well as intermediate periods (eg 1-24 hours). Such images are often referred to as a stack of images.

The method may thus involve relative movement between the specimen with and the scanning device. This may be achieved for example by displacing the scanning device along an axis (typically its Z axis) which is normal to the scanning plane to be imaged, so that the incident light can be brought to a focus at different points along that axis, each point lying in (and defining) a different focal plane, to enable the specimen to be scanned and imaged in different parallel spaced apart planes. Preferably movement is restricted to periods during which at least excitation light is not incident on the specimen and/or to periods during which the image capture device is also insensitive to light from the specimen luminescence.

Alternatively the optical path may be modified to define the different planes, by moving an objective lens or the specimen, typically by moving a holder containing the specimen.

Thus in a preferred arrangement a specimen carrier is displaced to define the spaced apart imaging planes.

The axis of displacement may be at an angle of other than 90° to the focal plane.

Typically the Z-axis movement is performed at the end of each said time period, or after N successive such time periods (N being an integer equal to or greater than 1). The movement may be such as to increase or decrease the distance between the scanning device or optical system element and the specimen.

Each Z-axis movement between exposures may be the same size or may differ from those before and/or following.

Z-axis movement is preferably made in discrete steps, each of a predetermined equal size and in that event, each Z-axis movement between exposures may be made up of M discrete steps, (where M is a whole number equal to or greater than 1).

Alternatively the Z-axis motion may be continuous. This allows faster motion between Z positions without having to wait for the Z mechanism to settle. The disadvantage is that the Z position is varying during the imaging with the result that the image can be blurred in Z. However this may be compensated for by applying deconvolution to re-sharpen the image.

Where the time required to alter the Z-axis spacing is greater than the minimum time needed between exposures, the method preferably includes the step of adjusting the time between exposures or controlling the illumination and image capture device exposure by reference to the Z-axis movement, such that excitation illumination and exposure is only initiated after a sufficient period of time has elapsed or after a desired Z-axis movement has been achieved.

The excitation light may be composed of light having two or more differing wavelengths.

Where the method involves variation of the wavelength of the excitation light from one exposure to another, the method preferably also includes the step of altering the excitation light wavelength between the end of one exposure and the beginning of the next.

Where the variation of excitation light wavelength is to be effected whilst focussing the light onto the same plane of the specimen (ie there is no Z-axis movement between each of a succession of two or more excitation and exposure steps making up a sequence of exposures, albeit each employing one or simultaneously two or more different wavelength(s) of excitation light), the Z-axis movement is initiated only after each complete sequence of exposures has been performed, and the next sequence of such steps is only initiated after each Z-axis movement has been completed.

Additionally, the stage of a microscope used in the system, and carrying a specimen, may effect larger scale X or Y motions (10 micron to 10mm) to bring into view other portions of a sample such as for example other cells on the same slide or other regions of tissue or sample.

A number of samples may be held in the wells of a multi-well plate. The samples may all be similar but may be different and may for example differ due to constituents, concentration or age. The multiwell place may be mounted on a microscope stage which is moved so as to bring different wells into registry, or different parts of a single sample in one of the wells into registry.

Additionally, the Z motion may be in one direction and then in another, alternately, to save time.

Wavelength variation may be achieved by employing two or more light sources of different peak wavelengths and selectively operating the sources, or selectively directing light from the sources in turn, as required, to the scanning device and specimen.

The light sources used may have more complex spectral characteristics (eg multiple peaks available from an Argon ion laser with a main line at 488 nm, and additional lines at 476 nm and 496 nm).

Where light of more than one wavelength is produced at the same time, the wavelengths may be selected by a single code (eg 2 lines to select one of 4 wavelengths as code 00, 01, 10, 11) or as a set of individual signal lines (eg 4 lines for 4 wavelengths). In this way several lines may be activated at the same time.

According to a preferred feature of the invention the excitation light may be obtained from one or more laser light sources.

Alternatively, the light source may comprise a directly driven laser diode.

In a preferred arrangement a single light source is employed which comprises an acousto optic tuneable filter (AOTF) crystal and the wavelength of the emitted light is altered by altering the frequency controlling signal to the crystal as required. Such an arrangement may contain a single laser source, or two or more laser light sources whose outputs can be optically combined.

Preferably any alteration of the frequency of the controlling signal is effected between exposures.

The excitation light may be pulsed.

The excitation light may be polarised.

A luminescent or incandescent light source may be used as the source of excitation light, and an optical filter or a monochomator employed to control the wavelength of the light emitted by the source.

Alternatively a light emitting diode (LED) source may be used which may comprise one or more light-emitting elements.

Where the intensity of the excitation light incident on the specimen is to be adjusted from one exposure to another, the method preferably involves the step of adjusting the intensity of the incident illumination between exposures.

This may for example be achieved by interposing neutral density filters, opening or closing an iris diaphragm in the light path, adjusting the power to the light source, employing an attenuating element such as an AOTF or LCD shutter or any combination thereof.

Where the intensity of the excitation light incident on the specimen at one wavelength, is different from that at another wavelength, such as may be due to inherent intensity variation as between one source and another, or between different modes of operation of a controlled excitation light source, the intensity of the excitation illumination between one wavelength and another may be adjusted so as to provide a predetermined intensity of illumination at the specimen for each wavelength.

Typically but not exclusively, the power adjustment from one exposure to another as wavelength varies, is such as to ensure a substantially similar level (ie intensity) of illumination at the specimen during the scanning making up each exposure, independent of wavelength.

A similar technique may be employed if the emission from the sample differs according to wavelength of the luminescence, and in order to render the emitted light of similar intensity (irrespective of wavelength), the power adjustment and/or attenuation from one exposure to another may also, or instead, be adjusted to provide substantially constant intensity luminescence irrespective of the wavelength thereof.

Preferably a system performing a method embodying the invention is controlled from a single control means such as a control centre which typically includes a programmable computer and one or more interfaces for converting signals produced by the computer into signals suitable for driving, or controlling, the supply of power to drives, or to control power to devices to effect the movements and rotations required by the different steps of the method.

A preferred mage capture device is a CCD camera. Such a camera can provide a picture signal in analogue or digital format. Preferably a camera is selected which produces a picture signal in digital format.

Where the image capture device is a CCD camera, it is preferably cooled to increase the S/N ratio of the camera output signals.

Alternative image capture devices which may be employed are a light sensitive sensor, a CMOS camera, a CID (charge injection device) camera, an intensified or gated camera, a photomultiplier tube array, a photodiode array or an image capture device employing an addressable microcolometer array, or a chemical film camera may be used.

Since the light presented to the image capture device is capable of forming an image, the light may be directed instead or as well to an eyepiece which will allow the image to be seen by the human eye, or to optical apparatus adapted to project the image onto a screen for viewing.

The light path to the image capture device may include a beam-splitting or beam directing device by which light can be split (or divided) between the image capture device, an eyepiece, or projection system.

A plurality of image capture devices may be employed each of which is supplied with light from the specimen and each of which may be the same type of device or different from the other device(s).

Cameras may be replaced by sensors.

Where one or more image capture devices are provided, the light path thereto may include a beam splitting means or beam directing means as appropriate.

The light image may be transmitted to an image capture device (which may be a sensor) via a fibre bundle.

The signals from the image capture device may be processed and/or analysed in real time, for example using a suitably programmed computer.

Signals from the image capture device may be stored for example in a frame store for subsequent analysis by a computer, or may be displayed in real time (or subsequently by reading out signals from the store) for visual inspection and analysis of an image produced from the signals.

The system may operate using dark field illumination, or Rheinberg illumination, phase contrast illumination, or Differential Interference Contrast (DIC) illumination.

The system may utilise Hoffman Modulation Contrast may be employed.

The illumination may be oblique or axial, and the illuminating light may be polarised and/or from a non-visible part of the spectrum such as infrared light.

Apparatus for imaging light emitted from a specimen, typically due to fluorescence of different parts of the specimen, onto an image capture device to produce a video signal for creating an image in a display device or for processing and analysis, comprises means for mounting the specimen, a light source for producing excitation light, a scanning system adapted to scan the specimen with the excitation light (as by directing excitation light in one direction towards, and thereby to scan an area of the specimen) and also adapted to convey light emitted from the specimen as a consequence of the excitation light impinging thereon in another (typically the opposite) direction, which operates in use to scan (typically repeatedly) an area of interest of the specimen, an image capture device having discrete spatially distinct light sensitive regions on which the light emitted from the specimen is focussed to form an image after being conveyed (i.e. passing) through the scanning system in the said other direction, and control means adapted to control the excitation light and/or the image capture device so that light from the specimen is incident on the image capture device for a time period equal to that required by the scanning system to scan the area of interest n times (where n is a whole number equal to or greater than 1).

The area of interest may be the whole of the viewable area of the specimen. Alternatively a window of variable size and location may be generated by the scanning system to enable part (or if desired all) of the area to be scanned. Thus a sub-array of variable size and location may be used.

The scanning system is preferably a confocal system

In a preferred arrangement the scanning system comprises a rotating Nipkow disc scanner in which excitation light passes through openings in the disc in one direction and light emitted by fluorescence of the specimen passes through the openings in the opposite direction to form an image on the image capture device, and the pattern of openings is such that rotation of the disc through A° results in scanning the whole of the area of interest and the said time period is selected to correspond to nA° of rotation of the disc (where n is equal to or a whole number greater than one).

A single Nipkow disc may be employed, but more preferably a 2-disc arrangement is employed in which one of the discs contains one containing microlenses in the openings, as described in the Yokogawa Technical Report No. 33 (2002). References herein to a disc (or disc means or disc arrangement) are intended to include multiple disc assemblies such as described in that Report, as well as single disc arrangements, where the content so admits.

Alternatively one or more lensless discs may be used (for example as described in U.S. Pat. No. 6,147,798). In this case, the rotation of the lensless disc (or discs) corresponds to rotation of a Nipkow disc.

The scanning system may incorporate a pinhole, or several pinholes in a fixed pattern (for example as described in U.S. Pat. No. 5,248,876 also WO 03/019242) where one complete scan of the pinhole (or pinhole array) corresponds to rotation of a Nipkow disc.

Alternatively the scanning system may incorporate a scanning slit scanner (for example as described in U.S. Pat. No. 6,038,076) where a scan of the slit corresponds to rotation of a Nipkow disc.

Confocality may be achieved by a 2 photon process which includes a 2 photon excitation source and which limits the focal plane of activation (see as described in U.S. Pat. No. 5,034,613) an wherein one pulse of the 2 photon excitation source corresponds to rotation of a Nipkow disc.

Alternatively confocality may be obtained by a time delay multiplexed process involving pinholes (as described by Bewersdorf, Pick and Hell in a paper entitled "Multifocal Multiphoton Microscope" 1998 Opt Lett. 23(9): 655-657) wherein one complete scan of the pinholes corresponds to rotation of a Nipkow disc.

Alternatively the scanning system may employ an array of independently controllable mirrors and means for adjusting same under the control of the control means, so that in use they synthesise an array of pinholes (see for example EP 0911667 and US 2002,024007) wherein one complete scan using the mirrors to create an image or subimage, corresponds to rotation of a Nipkow disc.

Alternatively the scanning system may include a random or quasi random pattern of transmissive and reflective elements (as described in WO 97/31282 and WO 0043819) which are scanned to produce an image where one complete scan of the transmissive and reflective elements corresponds to rotation of a Nipkow disc.

Preferably means is provided to prevent light from reaching the specimen except from the excitation source, and to prevent light from reaching the image capture device except from the specimen via the scanning system.

Preferably the control means also controls the operation of the image capture device whereby it is read out at the end of each said time period and is reset prior to the beginning of the next said time period.

Preferably means is provided by which light from the source of excitation light is incident on the specimen for a time precisely equal to each specific time period.

In one arrangement the control means switches the excitation light source on and off to control the exposure duration, and the image capture device exposure is in turn governed or controlled by the time for which the excitation light source is active.

Alternatively or additionally, shutter means may be provided which in use is operated by signals from the control means to interrupt light from the excitation source except for when the specimen is to be illuminated.

Alternatively or additionally the light may be controlled by an intrinsic (electronic) shutter.

Alternatively or additionally a light chopper may be used to control the light.

Alternatively an acousto-optic element may be used to perform the shutter function.

Alternatively or additionally, second shutter means may be provided between the scanning system and the image capture device, which second shutter means is operated by signals from the control means so that in use light is prevented from reaching at least part of the image capture device sensor, except for the specific periods of time during which excitation light is incident on the specimen, for the purpose of reducing errors which could arise from phosphorescence, afterglow, stray reflections or light from other effects, reaching the capture device.

If shutter means is provided for both excitation source and image capture device, means is preferably provided whereby in use, they are operated synchronously.

The synchronising means may be mechanical or electrical or both.

In use the scanning system preferably focuses the excitation light in a plane which contains or comprises the area of the specimen to be illuminated by the excitation light, and in general comprises the area of interest.

Where the specimen is largely transparent, the apparatus may also include drive means adapted to move the specimen, the scanning system, or an element of an optical system within the scanning system, along a linear axis (the Z-xis) so that in use the plane can be positioned at different points along the Z-axis, to enable the specimen to be scanned in different (typically parallel) spaced apart planes.

Preferably the linear axis drive means is also controlled by signals from the control means.

Preferably the control system operates so that in use linear axis movement is restricted to periods during which at least excitation light is inhibited (or prevented from reaching the specimen) and is preferably restricted to periods during which the image capture device is rendered insensitive to light.

Typically the control means controls the linear axis drive in use so as to effect the linear axis movement at the end of each said time period, or after a succession of N such time periods, (N being an integer equal to or greater than 1). The movements may be such as to increase or decrease the distance between the specimen and the scanning system, or an element of the scanning system, or an element of an optical system within the scanning system.

The control system is preferably adapted to control the distance moved along the linear axis between exposures.

Each movement in the linear axis may be same size or may differ in size from those before and/or following.

Preferably the control system is adapted to control the linear axis drive to move in discrete steps each of a predetermined equal size, and in that event each linear axis movement between exposures may be made up of one or more than one of the said discrete steps.

Alternatively the linear axis motion may be continuous. This allows faster motion between different imaging positions without having to wait for the mechanism to settle. The disadvantage is that the imaging plane will vary during the imaging process with the result that the image can be blurred. However this may be compensated for by applying deconvolution to re-sharpen the image.

Where the time required to alter the linear axis spacing is greater than the minimum time needed between exposures the control means is adapted to control the time between exposures or to control the illumination and image capture device exposure by reference to the Z-axis movement such that excitation illumination and exposure is only initiated after a sufficient period of time has elapsed, or after desired linear axis movement has been achieved.

Multiple images may be collected over short periods of time (eg 1 minute-60 minutes) or extended periods of time (eg 24-72 hours) as well as intermediate periods (eg 1-24 hours). Such images are often referred to as a stack of images.

Where the method involves variation of the wavelength of the excitation light from one exposure to another, the apparatus may comprise two or more excitation light sources each producing light of a different wavelength from the, or each, other source, or may comprise a single source which is adjustable to produce light of different wavelengths, and the control means is adapted to select between the source, or to control the single source, to alter the excitation light wavelength, preferably between the end of one exposure and the beginning of the next.

Where the variation of illumination wavelength is to be effected whilst focussing the light onto the same plane of the specimen (ie there is to be no linear axis movement between each of a succession of two or more exposure steps making up a sequence of said steps, albeit each employing one (or simultaneously two or more) different wavelength(s) of excitation light the control means may be adapted to control the linear axis drive means so that linear axis movement is initiated only after each complete sequence of said steps has been performed, and the next sequence of said steps is only initiated after each linear axis movement has been completed.

Typically the specimen is carried by a microscope stage and a stage drive is provided to move the stage (and specimen) in X and Y, to bring into view other portions of a sample such as for example other cells on the same slide, or other samples in a multiwell plate, or other regions of tissue or of a single sample. To this end the X or Y steps may be in the range 10 microns to 10 mm.

A number of samples may be held in the wells of a multiwell plate. The samples may all be similar but may be different and may for example differ due to constituents, concentration or age.

The linear drive may be controlled so as to produce linear motion alternatively in one direction, and then in another, to save time.

Wavelength variations may be achieved by employing two or more light sources of different peak wavelengths and selectively operating the sources, or selectively directing light from the sources in turn, as required, to the scanning device and specimen.

It is to be understood that the spectrum of a source of light (even when designated as producing light of one wavelength), actually includes light at a number of wavelengths, in which the intensity of the light at and close to the designated wavelength is much greater than other components of light in the source spectrum. In that event the source is said to peak at the designated wavelength.

Thus the light sources used in apparatus for performing the invention may have more complex spectral characteristics, for example multiple peaks available from an Argon ion laser with a main line at 488 nm, and additional lines at 476 nm and 496 nm.

Where the excitation light source produces light of more than one wavelength at the same time, Individual (peak) wavelengths may be selected by a single code (eg 2 lines to select one of 4 wavelengths as code 00, 01, 10, 11) or as a set of individual signal lines (eg 4 lines for 4 wavelengths), so that several lines may be activated at the same time.

According to a preferred feature of the invention the excitation light source may comprise a laser light source, which may comprise one or more than one laser.

A single excitation light source may be employed, whose emitted wavelength can be altered, and the control means may be adapted in use to alter the source to produce a desired wavelength.

Preferably a laser light source is employed which comprises an acousto-optical tuneable filter (AOTF) crystal, and the control means is adapted to provide in use signals to alter the frequency controlling signal to the crystal, between exposures, to control the wavelength of the emitted light.

The light source may be a directly driven laser diode.

Preferably any alteration of the frequency of the controlling signal is effected between exposures.

The excitation light may be pulsed as by pulsing the source.

The excitation light may be polarised, either by using a polarised light source or by using a polarising filter.

The excitation light source may be a luminescent or incandescent source and an optical filter or a monochromator may be employed to control the wavelength of the light emitted by the source in use.

Alternatively a light emitting diode (LED) source, which may comprise one or more light-emitting elements, may be used as the excitation light source.

Where the intensity of the excitation illumination incident on the specimen is to be adjusted from one exposure to another, the control means may be adapted to adjust in use the intensity of the excitation illumination incident on the specimen, preferably between exposures.

This variation may for example be achieved by interposing different neutral density filters in the light path.

Therefore apparatus may comprise a plurality of neutral density filters and means under the control of the control means, which in use selectively positions one or more of the filters in the light path, (preferably during the time intervals between exposures) to achieve the density variation.

Alternatively the apparatus may comprise an adjustable iris diaphragm in the light path and drive means operated by the control means to open or close the iris as required, preferably in the time intervals between exposures.

Alternatively and preferably the excitation light intensity may be controlled by adjusting the power supplied to the excitation light source, and to this end the control means may be adapted to generate signals for controlling the power source for the excitation light source, or the transfer of power thereto, as appropriate.

An attenuating element such as an AOTF or LCD shutter may be used to control the intensity of the excitation light incident on the specimen, the AOTF or LCD shutter being controlled by signals from the control means.

The excitation light intensity may be controlled by using two or more such intensity varying techniques in combination, typically in series.

Where the intensity of the excitation illumination at one wavelength is different from that at another wavelength such as may be due to inherent intensity variation as between one source and another or between different modes of operation of a controlled excitation light source such as an AOTF crystal laser, or of the emission of a crystal due to excitation, the control means may be adapted to alter in use the intensity of the illumination between one wavelength and another so as to provide a predetermined intensity of illumination at the specimen for each wavelength, so as to substantially remove variation in intensity as between one wavelength and another, which can otherwise occur.

Typically but not exclusively, the control means is adapted in use to control the power to the excitation light source from one exposure to another as wavelength varies, so as to ensure a substantially similar level of excitation illumination (intensity) at the specimen during each exposure, which level is independent of wavelength.

A similar technique may be employed if the emission from the sample differs according to wavelength of the luminescence emitted, and in order to render the emitted light of similar intensity (irrespective of wavelength), the power adjustment and/or attenuation relating to the excitation light source, from one exposure to another, may also, or instead, be adjusted to provide substantially constant intensity luminescence irrespective of the wavelength used.

The image capture device may comprise any convenient light sensitive sensor.

A preferred image capture device is a CCD camera. Preferably a CCD camera is selected which provides a picture signal in digital format as opposed to analogue format.

Where the image capture device is a CCD camera, it is preferably cooled to increase the S/N ratio of the camera output signals.

Alternative image capture devices which may be employed are a CMOS camera, a CID (charge injection device) camera, an intensified or gated camera, a photomultiplier tube array, a photodiode array or an image capture device employing an addressable microcolometer array or a chemical film camera may be used.

Since the light presented to the image capture device is capable of forming an image, the light to be supplied to the image capture device may be directed instead (or as well) to an eyepiece which will allow the image to be viewed by the human eye, or to projection apparatus which is adapted to project an image onto a screen for viewing.

To this end the light path to the image capture device may include a beam-splitting or beam directing device by which light can be split (or divided) between the image capture device, and/or an eyepiece and/or a projection system.

One or more image capture devices may be employed each of which may be the same type of device or may be different. Where more than two image capture devices are employed, at least one may differ in type from one or more of the others, and they may all be different.

Cameras may be replaced by sensors.

Where one or more image capture devices are provided, the light path thereto may include a beam splitting means or beam directing means as appropriate.

The light may be transmitted to the or each image capture device sensor via an optical fibre bundle.

The apparatus may include a data storage means adapted to store signals from the image capture device for subsequent analysis by a computer, or displayed on a screen for visual investigation or analysis of an image produced by reading out the stored signals.

The apparatus may also include computer means adapted to receive the signals from the image capture device or the data storage means, to permit processing and analysis of the image signals.

A signal path to a display device from the image capture device, or the computer may be provided so that an image can be formed using the image capture device output or the data stored in the storage means or from the computer before and/or after processing.

It is to be understood that in place of a laser and AOTF, or a shutter, to control excitation light, a diode laser source may be employed which has beam control built in. In this context reference to a shutter can be considered to refer to switching or modulating a diode laser source.

BRIEF DESCRIPTION OF THE DRAWINGS

The invention will now be described by way of example with reference to the accompanying drawings in which:

FIG. 4 is a block schematic diagram showing how the system of FIG. 2 is switched through a sequence of different machine states;

FIG. 5 is a block schematic diagram of the controller board;

FIGS. 6A-6C are waveform diagrams showing control signal protocols for different operating systems;

FIGS. 8A and 8B are system and state diagrams of a system in which further control signals are generated by the controller;

FIGS. 10A and 10B are system and state diagrams of a system in which the controller is externally triggered or can allow inputs to be used for external devices.

DETAILED DESCRIPTION OF THE INVENTION

Figure 1:
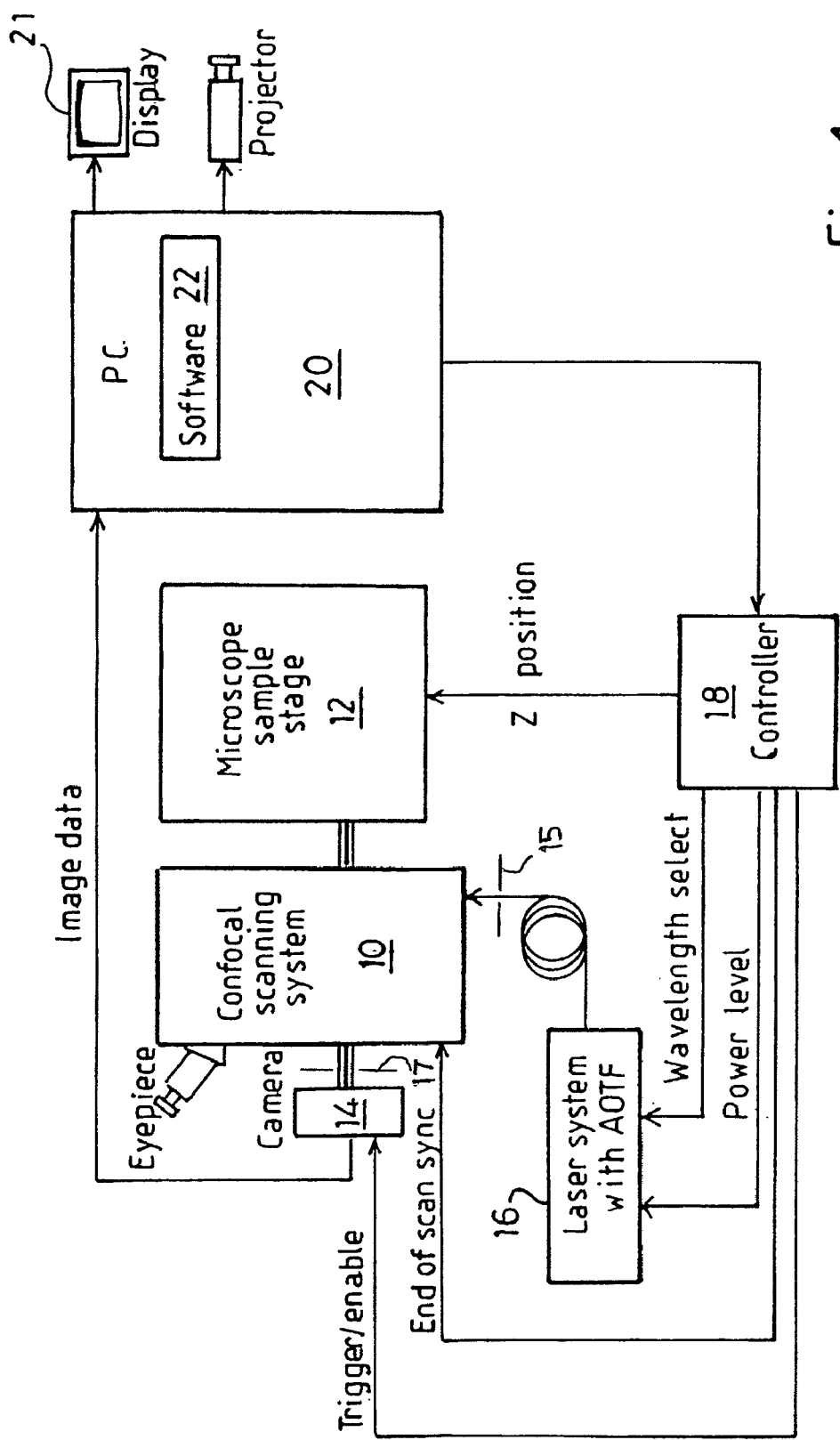
FIG. 1 is a schematic diagram of a Confocal microscope system.
Figure 2:
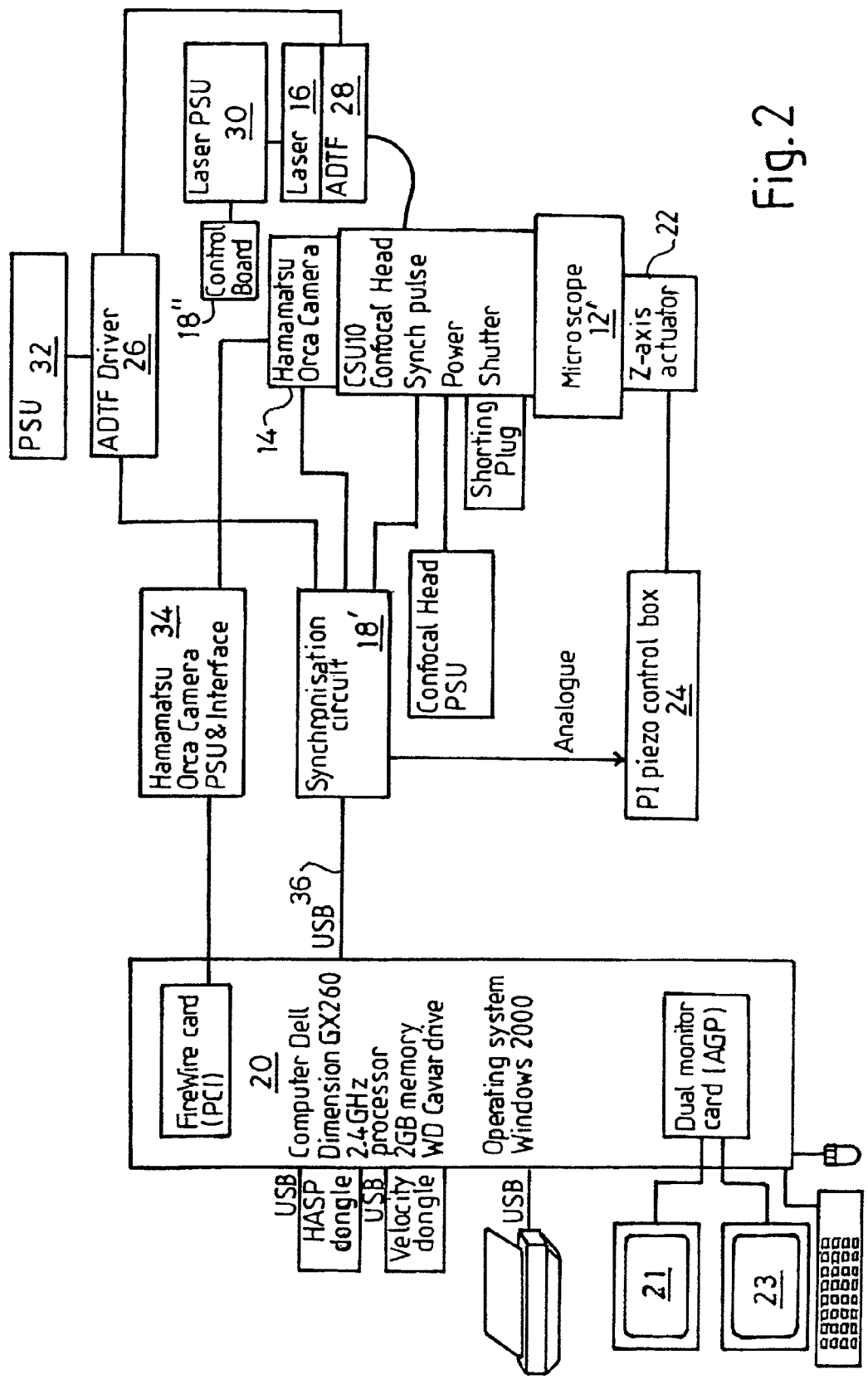
FIG. 2 is a system diagram giving details of proprietary hardware which can be connected to the computer based controller of FIG. 1 to enable the method of the invention to be performed.
Figure 3:
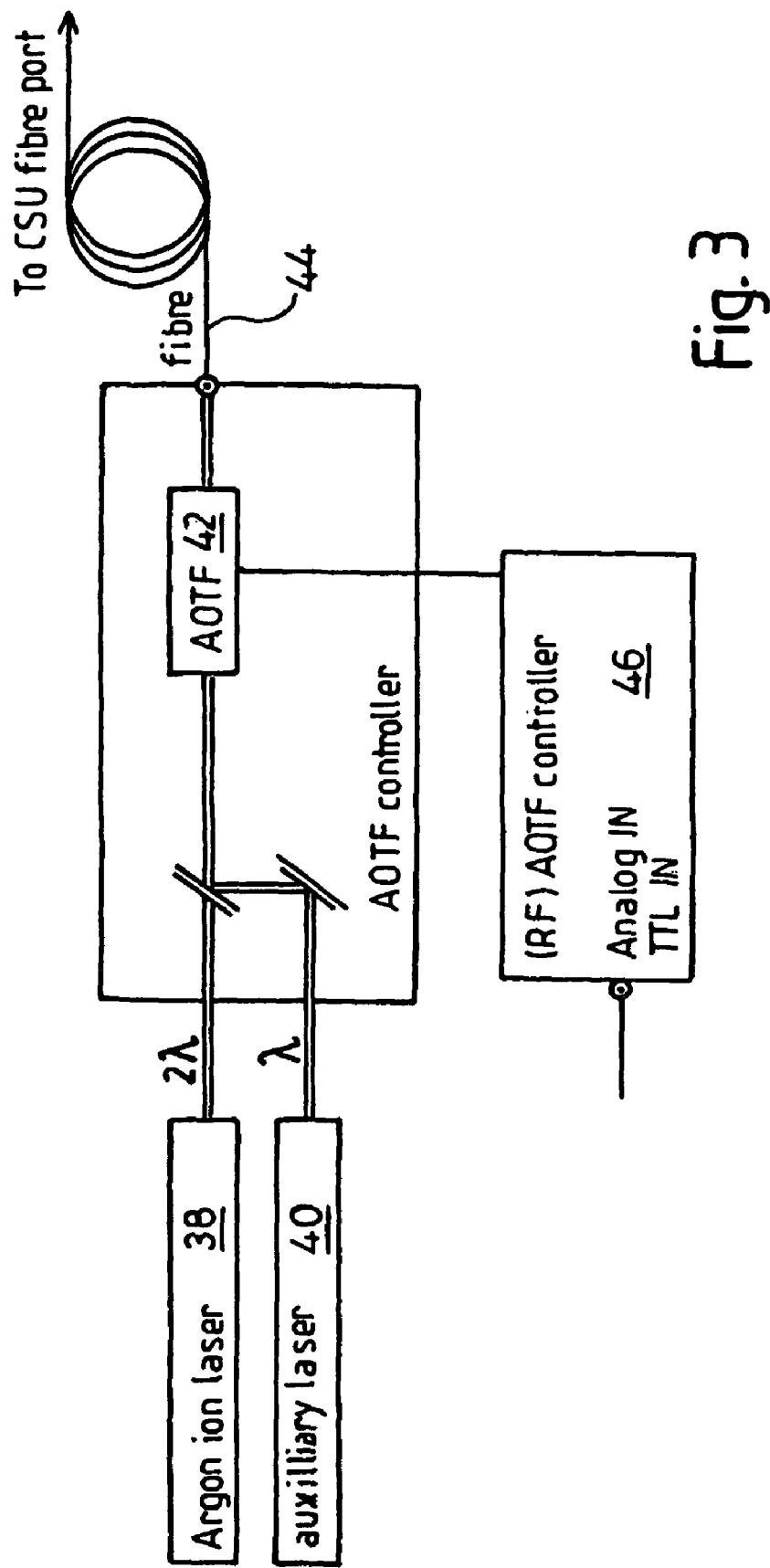
FIG. 3 is a schematic diagram of an AOTF laser control system.

Reference is made to of the Yokogawa Technical Report No. 33 (2002) and in particular FIGS. 1 to 3 of that Report and the related description, for a description of the operation of a CSU10 con-focal scanning system.

In FIG. 1 the con-focal scanning system 10 may comprise a Yokogawa confocal scanner (which may be a model CSU 10 or the more recent model CSU21), set to view a sample (not shown) on a stage 12 and provide light to a camera 14 to form an image thereon of fluorescence arising from excitation of the sample by laser light from an AOTF laser source 16.

A controller 18 converts signals from a computer 20 into control signals for operating or controlling the operation of items 10, 12, 14 and 16 and in turn can transmit data from these items to the computer 20, if required. Software 22 is shown loaded on the computer enabling the latter to be instructed to perform particular tasks or control items 10 to 16 in different ways, depending on the sample or experiment to be performed. Alternatively different software can be loaded as required to enable the system to perform different tasks or experiments.

FIG. 2 shows the various items of proprietary hardware which can be interconnected to constitute an operating example of the system of FIG. 1. The controller 18 of FIG. 1 is made up of the synchronisation circuit 18' and control board 18" in FIG. 2, and the computer 20 is identified as a Dell Dimension GX260 loaded with Windows 2000 as the basic operating system, having a 2.4 GHz processor and 2GB of RAM and a WD Cavlar drive, with a dual monitor card for driving two display monitors 21 and 23.

The microscope 12 is typically a Nikon eclipse model TE300 and as mentioned in relation to FIG. 1 the con-focal scanning unit comprises a Yokogawa model CSU10 or CSU21. Z-axis adjustment is achieved using a Physik Instrument piezoelectric driver 22 which is controlled by a proprietary control unit 24 provided with analogue control signals from 18.

The laser excitation light source is an Omnichrome Series 43 (3 wavelength) laser as supplied by Melles Griot Laser Group of California operating with an AOTF crystal and controller from NEOS of Florida. The light intensity of the laser is controllable from the Control board 18" which (as indicated above) together with the synchronisation unit 18' makes up the controller 18 of FIG. 1. A driver 26 controls the AOTF control 28 for the laser 16 whose power supply is shown at 30.

The camera 14 is a Hamamatsu Orca EP CCD camera.

A power supply for the driver 26 is shown at 32 and a power supply and interface for the camera 14 is shown at 34.

The synchronisation circuit 18' is connected to the computer 20 via a USB connection 36.

FIG. 3 shows details of the AOTF laser, as comprising an Argon ion laser 38 and auxiliary laser 40. An AOTF crystal 42 controls the wavelength of the light emitted via fibre 44 and the CSU10 fibre port.

The crystal 42 is controlled by an RF signal from the controller 46 which in turn is controlled by TTL and analogue signals from the computer 20 via circuit 18' and driver 26 (see FIG. 2).

The State diagram of FIG. 4 shows how the 1 KHz clock signal controls the different operations required of the system.

FIG. 4 is a state diagram containing a set of output registers labelled line on/off (48), laser line (50), Z position (52), camera (54), and head sync (56); a duration down counter (58), a state counter (60), and a memory 62 containing a plurality of separate bit pattern, each pattern defining one of the desired machine states. The bit outputs of some of the output registers are connected directly to digital ports on devices which can be controlled by such signals, such as the laser line ON/OFF selection 48 systems, the camera trigger and the CSU scanning disc system synch input. Digital signals from output registers 50 and 52 are converted from digital to analogue signals by DAC's 64, 66 to provide analogue signals to analogue ports on the AOTF system and the piezo stage drive, which typically drives the stage along two different axes.

A clock signal, typically of 1 KHz, is supplied to the duration downcounter 58.

Typically the state data is stored in the host computer 20 and is loaded into the memory 62 from the host computer.

At initialisation, the state counter 60 is loaded with the number of states. The first state is transferred from the first line in memory 62 to the output registers 48 to 56, so as to set the states of the devices supplied with control signals therefrom. The intended duration of the first state is loaded as a number into the state duration down-counter 58 from state duration memory 68.

At the next clock pulse, the numerical value held in the duration counter 58 is decremented by one, and its new value compared with zero. If non-zero, the states of the output registers 48-56 are maintained.

When the numerical value in the duration counter 58 reaches zero, the state counter 60 is clocked by one and now points to the next state bit pattern in the memory 62. This next state is transferred from 62 to the output registers 48 to 56, so as to set the states of the devices they control to the new condition required of the machine and the duration for this next state is transferred from 68 to the duration counter 58 to control the duration of this next state, which is replaced by the next state from memory 62 each time the duration counter 58 numerical value reaches 0.

The system operation progresses from one state to the next until the state counter 60 is decremented to zero at which point the operation stops. A stop signal may be generated at this pint and the system may be set up to start again upon generation of this stop signal.

Messages relevant to different operations/states are set out below.

USB Message Types

Interrogation

This message is a work around to cope with initial lack of a USB vendor ID. The USB master interrogates each unit to find out what type it is.

| Message type | 0x00 | 1 byte |
|---|---|---|
| Filler (usually all 0x00) | | 3 bytes |
| | | 4 bytes |

The synchroniser replies with:

| Message type | 0x00 | 1 byte |
|---|---|---|
| Second byte of interrogation message echoed (i.e. 0x00) | | 1 byte |
| 0x12 (i.e. ASCII DC2) | | 1 byte |
| 0x36 (i.e. ASCII '6') | | 1 byte |
| | | 4 bytes |

Initialisation

This message is sent before any experiments are conducted, to set the default output state and the confocal head parameters.

| Message type | I | 1 byte |
|---|---|---|
| Digital outputs (Camera trigger bit 7, bits 0 to 6 general purpose) | | 1 byte |
| AOTF bits | | 1 byte |
| Z position (see note 1) | | 2 bytes |
| Sync pulse on period, ms (see note 2) | | 1 byte |
| Sync pulse off period, ms (see note 2) | | 1 byte |
| Sector time, ms (see note 2) | | 1 byte |
| | | 8 bytes |

Z-Axis Drive

Z-axis drive position is given by:

$$Pz/(100 \text{ μm}/2^{16})$$

Or $$Pz/(1.526 \text{ nm})$$

Where Pz is the desired Z position and a sensitivity of 10 μm/volt and a 10 volt output span is assumed. Up to 16 bits are available for this value, but the embodiment being described responds only to the most significant 12 bits, which gives a resolution of 25 nm.

Sector Time Synchronisation

Sync pulse times, number of sectors and camera exposure times are all constrained by the requirement for every event to be synchronised to sector times.

For example, a 12 sector disk could have the following parameters.

| Disk RPM | 5000 | 2500 | 1666.667 |
|---|---|---|---|
| Disk Hz | 83.33333 | 41.66667 | 27.77778 |
| Sector time ms | 1 | 2 | 3 |
| Sync Hz | 166.6667 | 83.33333 | 55.55556 |
| Sync period ms | 6 | 12 | 18 |

The Yokogawa CSU10 and CSU21 systems would be limited to 3 ms per sector in the present design.

State Data Header and Footer

The following message is sent before (header) and after (footer) the list of State Data. Any State Data that is already stored is cleared when the header is received. The message is ignored if the synchroniser is running. The messages are referred to as State list headers and State list footers.

| Message type | H | 1 byte |
|---|---|---|
| Sub-type | | 1 byte |
| H: Header | | |
| F: Footer | | |
| | | 2 bytes |

State Data

State data should immediately follow a state list header. The synchroniser is set to check that the correct number of states are received before executing anything.

| Message type | D | 1 byte |
|---|---|---|
| Time for this state to persist (in sector widths) | | 2 bytes |
| Digital outputs (Camera trigger bit 7, bits 0 to 6 general purpose) | | 1 byte |
| | | 1 byte |
| | | 2 bytes |
| | | 7 bytes |

Experiment Control

Once State Data has been downloaded, the system can be controlled to perform an experiment.

| Message type | C | 1 byte |
|---|---|---|
| Action code: | | 1 byte |
| L | Start live mode (immediate data is accepted and retained) | |
| O | Start experiment to run once (immediate data is ignored) | |
| S | Start experiment in continuous loop (immediate data is ignored) | |
| C | Stop cleanly (stop execution at the end of the state list) | |
| I | Stop immediately (stop everything and revert to the initialisation data) | |
| | | 2 bytes |

Immediate Data

If capture is started in live mode, the digital outputs, AOTF blanking and Z stepper may be altered at will. The camera trigger bit (digital output bit 7) is ignored in all immediate data.

| Message type | M | 1 byte |
|---|---|---|
| Data type: | | 1 byte |
| C | Digital output data (1 byte follows) | |
| A | AOTF blanking data (1 byte follows) | |
| Z | Z stepper position (2 bytes follow) | |
| Data | | 2 bytes |
| | | 5 bytes |

AOTF/DAC Control

This message is sent to set the AOTF channel power. It would not be sensible for the AOTF levels to be changed during an experiment, but for simplicity the synchroniser will always respond to them—this enables the levels to be tweaked while in live mode.

| Message type | A | 1 byte |
| --- | --- | --- |
| AOTF address (1 to 8) | | 1 byte |
| AOTF data | | 1 byte |
| | | 3 bytes |

| state | line on/off | laser line | Piezo | camera | sync | count |
| --- | --- | --- | --- | --- | --- | --- |
| 0008 | 0000 | 0000 | 0110 | 0 | 1 | 0001 |
| 0007 | 0010 | 0200 | 0110 | 0 | 0 | 0001 |
| 0006 | 0010 | 0200 | 0110 | 1 | 0 | 0002 |
| 0005 | 0010 | 0200 | 0110 | 0 | 0 | 0001 |
| 0004 | 0010 | 0000 | 0110 | 0 | 0 | 0001 |
| 0003 | 0001 | 0100 | 0330 | 0 | 0 | 0001 |
| 0002 | 0001 | 0100 | 0330 | 1 | 0 | 0001 |
| 0001 | 0001 | 0100 | 0330 | 0 | 0 | 0001 |
| 0000 | 0001 | 0100 | 0330 | 0 | 0 | 0001 |

State Machine Sample Content

The system carries out a given state for 'count' clock ticks and outputs persist at given value for this time.

As described the invention provides a control system or synchroniser to sequence a Nipkow disc laser scanning confocal microscope imaging system having a Z-axis drive. The system requires a host computer (20) and controller (18) and is programmable to perform a wide range of tasks and is connectable to a Nipkow disc confocal microscope hardware via a communication line such as a USB connection.

The controller (18) may be constructed as shown in FIG. 5, using a 8051 microcontroller which is programmed to function as the state machine described with reference to FIG. 4. The unit (18) includes a clock input 69, the DAC's 64 and 66 and output ports as follows, (although it is to be understood that any other suitable microprocessors or programmable logic device could be used to control the subsystem), namely USB port 70—one port for configuration, timing and power.

Sync output port 72—variable 0-3Vpk-pk, programmable high and low periods in 1 ms increments, as described with reference to Initialisation TTL output ports 74—8 bits for AOTF switching; 67 employing up to 8 bits for camera trigger, shutter control and/or general purpose use; (For example one bit may be dedicated to camera triggering and the rest may be controlled asynchronously when in live mode); and 72 for synchronising disc sector speed.

An analogue output from DAC 64—8 channels, 0-5 volts, 8 bit resolution. For AOTF power setting and/or general use. Not synchronised, but may be controlled asynchronously or synchronously, and An analogue output from DAC 66—0-10 volts, 12 bit resolution. Typically synchronised to disc sector speed, but may be controlled asynchronously when in live mode.

In the control signal protocol diagrams of FIGS. 6A, 6B and 6C the values of the control signals are shown for a typical system such as described with reference to FIGS. 2-5.

The trigger/enable signal controls the activation of the camera, which alternates between active "on" and inactive "off" states.

The "end of scan sync" indicates the end of the pinhole scan sequence corresponding to an entire disc rotation, where each disc consists of a number of sectors.

"Wavelength select" indicates the different wavelengths selected for excitation.

"Power level" indicates when the power is ON and OFF. This is typically switched from OFF to nominal power level "p".

Figure 6A:
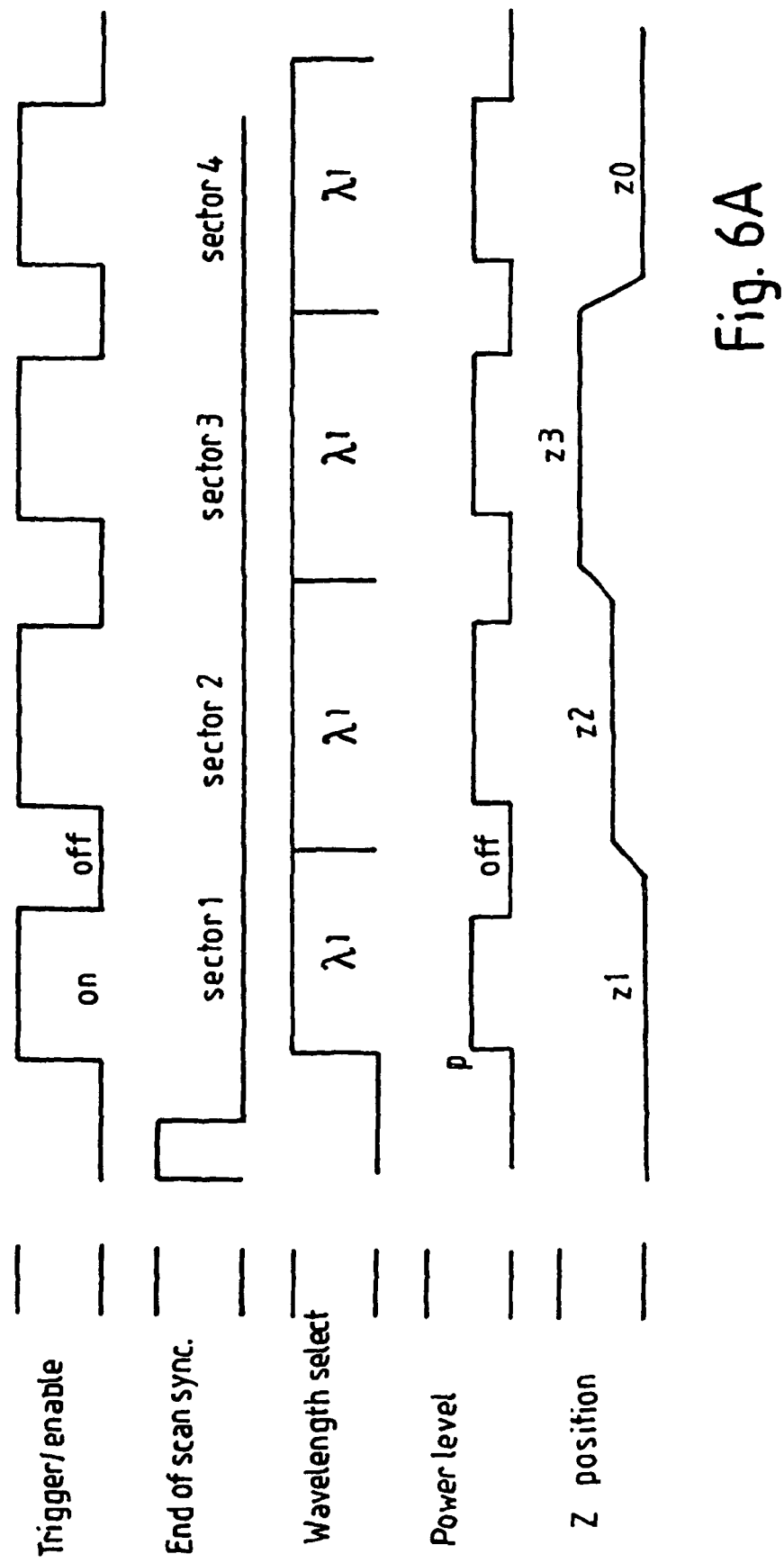

The "Z position" waveform of FIG. 6A indicates how the control signal determining the different sample scan planes in the Z axis can increase in steps from Z1 to Z2 and Z3 before returning to a Z0 position ready for the next scan sequence, while the wavelength remains constant.

In FIG. 6B the Z position determining signal ramps at a constant rate from Z0 to a maximum value for Z (i.e. X3) and then rapidly reduces in value back to X0 ready for the next scan.

Figure 6C:
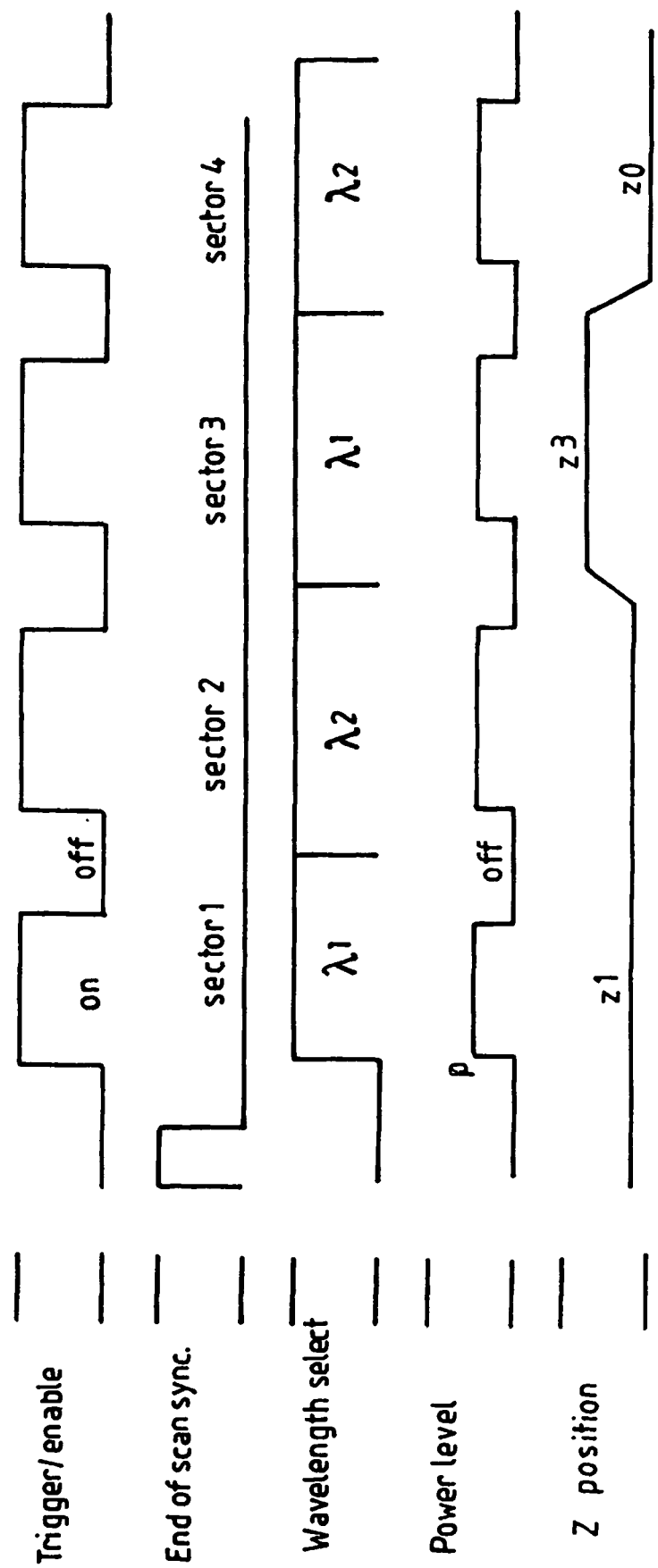
Figure 7:
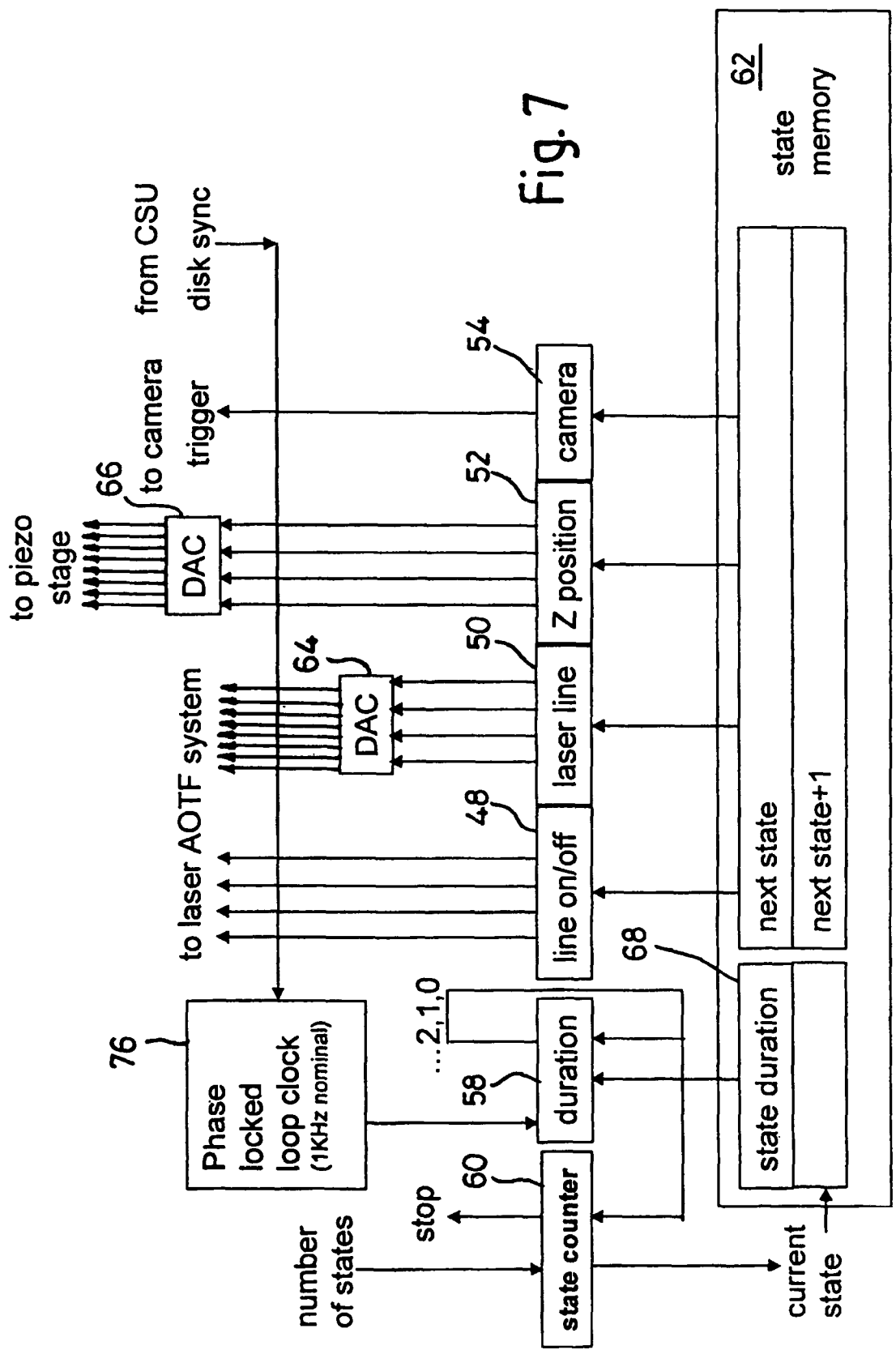
FIG. 7 is a state diagram of a system operated as a phase locked loop.

FIG. 6C shows how the Z position signal varies between Z1 and Z3 during two successive scans during each of which the wavelength is altered from X1 to X2 during a power OFF interval FIG. 7 shows the states of a system such as that of FIGS. 2-5 when operated as a phase locked loop about the natural frequency of the disc rotation pulse, where the disc rotation speed is set by the CSU controller. In this system, the rate of the clock to the counter is adjusted by the actual rate of disc rotation. Disc sync signals are supplied to a phase locked loop clock 76 which controls the duration counter 58 in place of the 1 KHz clock of FIG. 4.

Figure 8A:
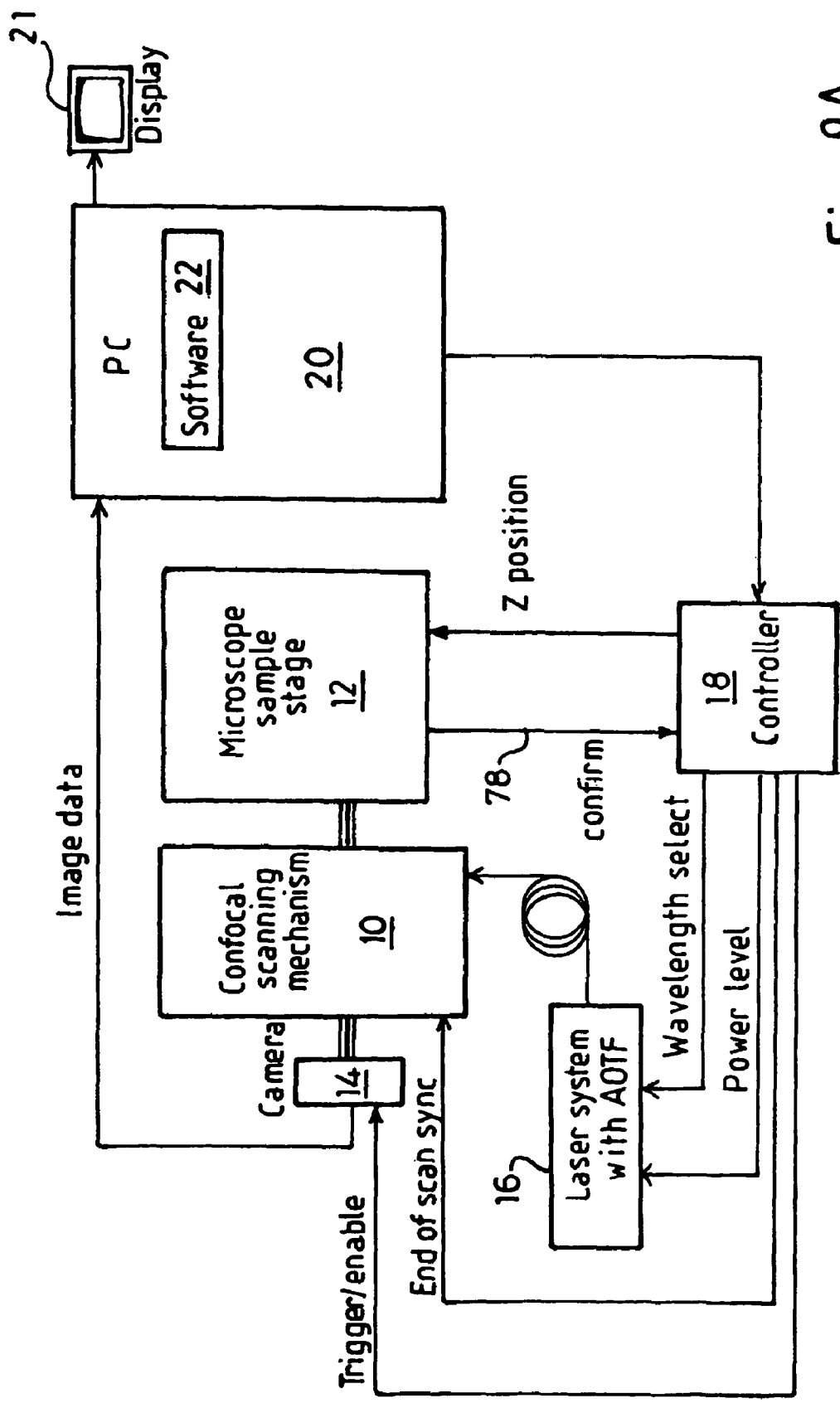

FIGS. 8A and 8B relate to an alternative arrangement in which further control signals pass from the controller 18 and the microscope 12 for other control functions such as stage and objective control as depicted by the confirm signal path 78.

Figure 9A:
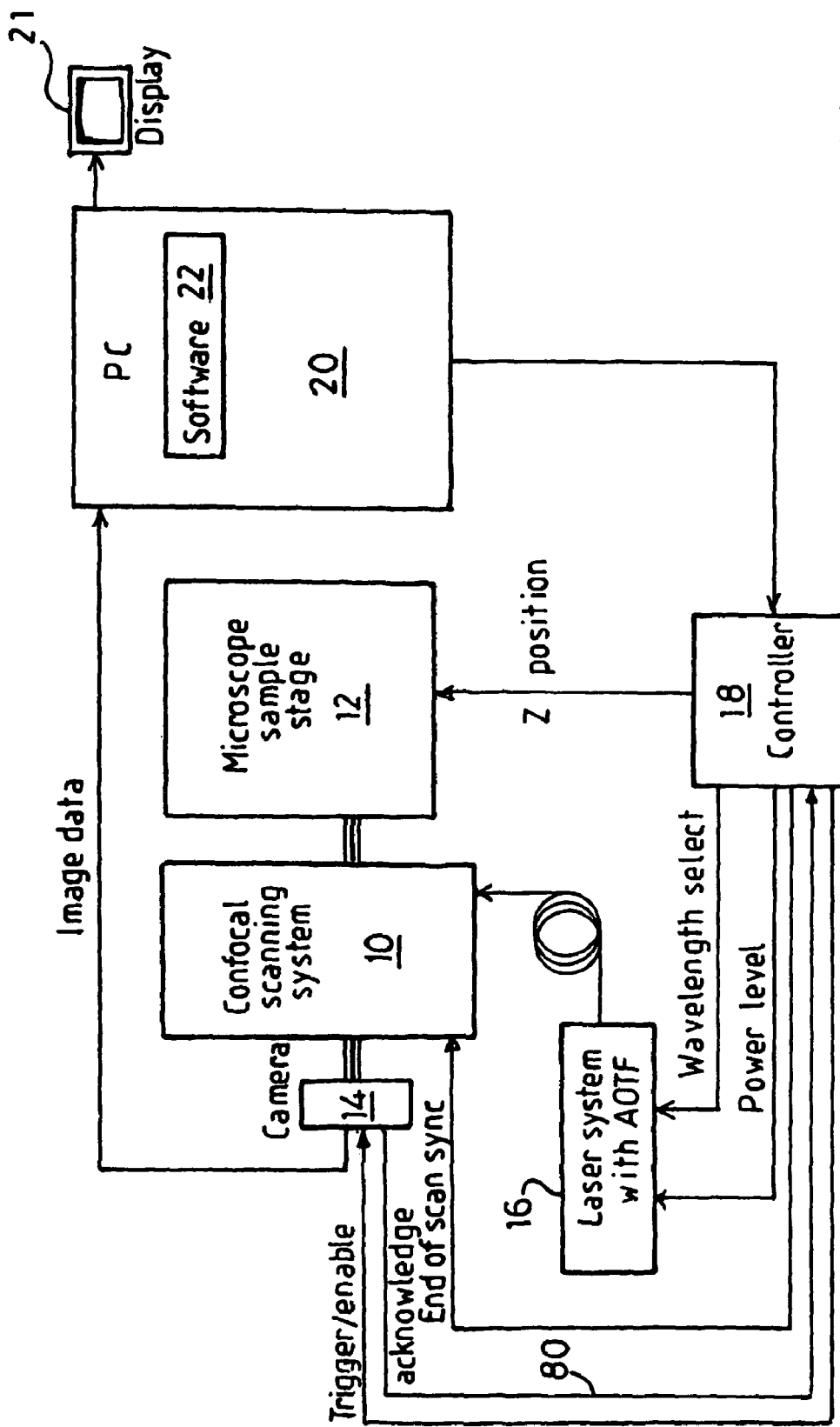
FIGS. 9A and (b are system and state diagrams of a system in which triggering of a camera generates trigger acknowledgement signals for feedback to the controller.
Figure 9B:
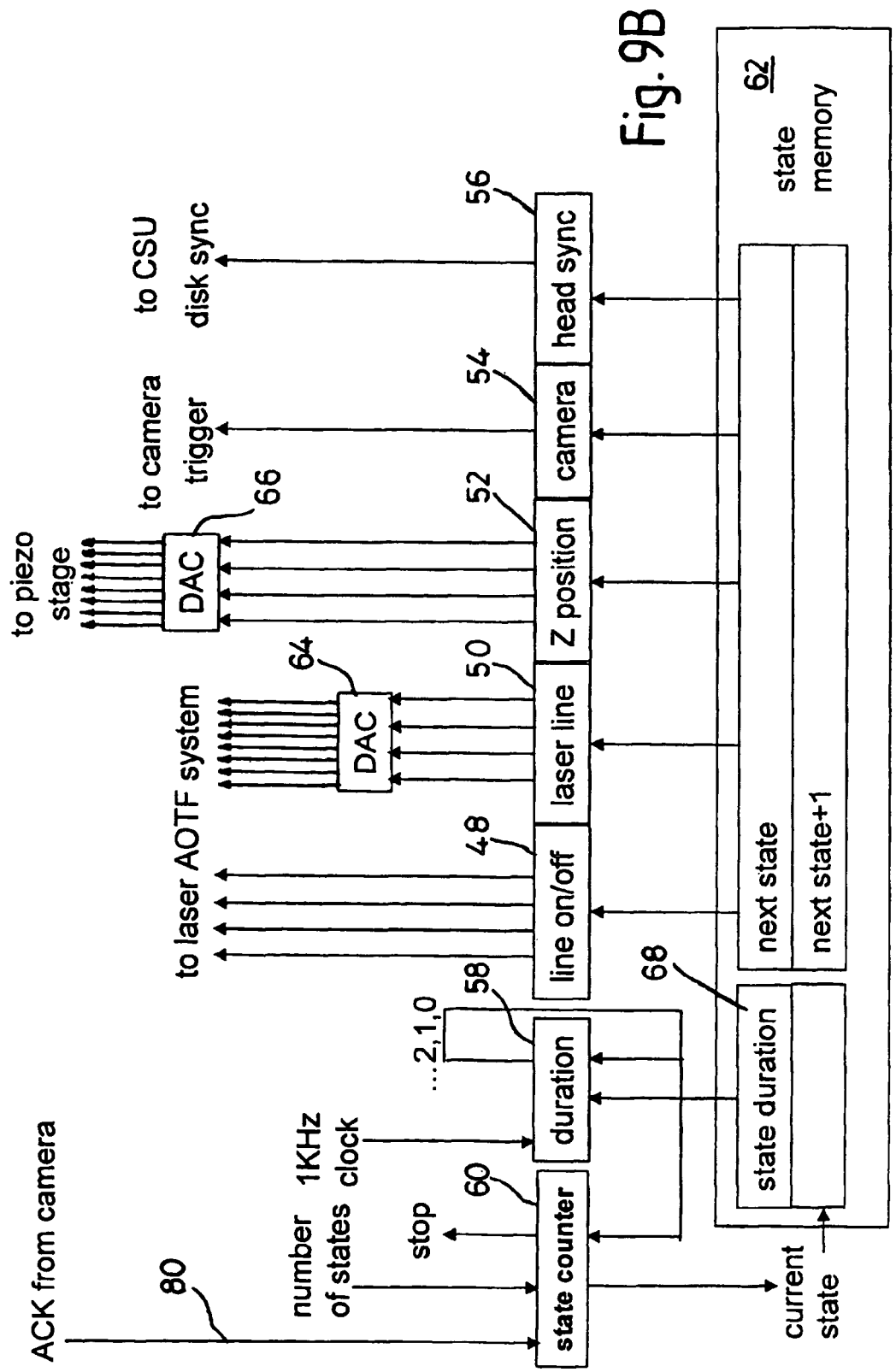

FIGS. 9A and 9B relate to another modification of the system of FIGS. 2-5, in which further control signals pass from the camera 14 to the controller 18 to acknowledge triggering, such as an acknowledge signal along path 80.

Figure 10A:
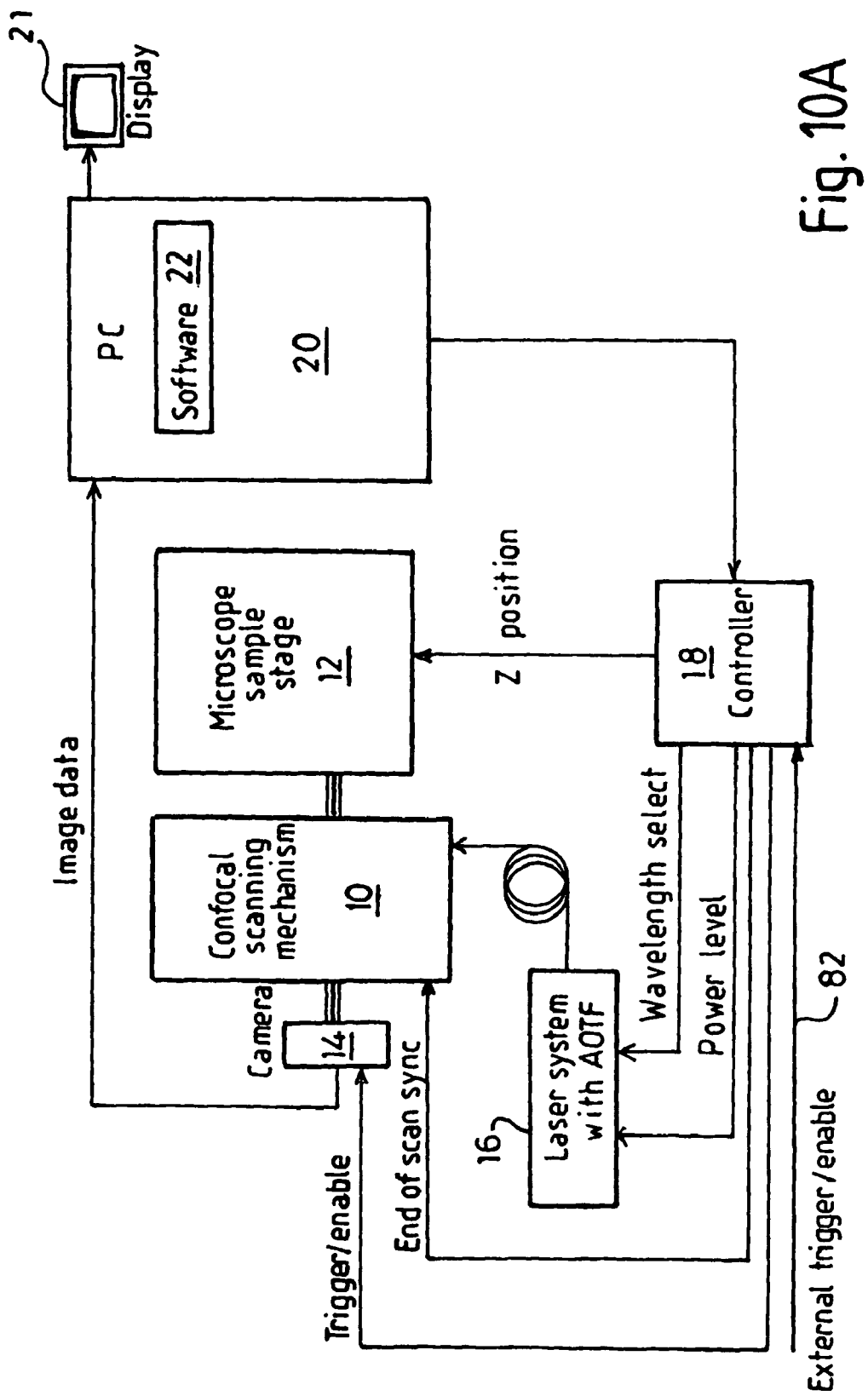

FIGS. 10A and 10B show how the controller 18 can be externally triggered or can receive an enable input from an outside device along path 82.

The invention claimed is:

1. An apparatus by which light emitted from a specimen is imaged by an image capture device to produce a video signal for creating an image in a display device or for processing and analysis, comprising:
   means for mounting the specimen,
   a light source for producing excitation light,
   a confocal scanning system adapted to direct excitation light in one direction towards, and thereby to scan, an area of the specimen and also adapted to convey light emitted from the specimen as a consequence of the excitation light incident thereon, in another direction, which operates in use to scan typically repeatedly an area of interest of the specimen,
   an image capture device having discrete spatially distinct light sensitive regions on which light emitted from the specimen is focussed to form an image after being conveyed through the scanning system in said other direction, and
   control means comprising a host computer and a controller, the controller being programmed to function as a state machine, with the host computer arranged to supply state data to the state machine controller, the state machine controller having a state counter, a state memory and a duration downcounter which receives a clock signal and being adapted to control the scanning system, the excitation light source and the image capture device so that, for each image to be formed at the image capture device, light from the specimen is only incident on the image capture device for a specific time period equal to that required by the scanning system to scan the area of interest n times where n is a whole number equal to or greater than 1.

2. The apparatus as claimed in claim 1 further comprising shutter means which in use is operated by signals from the control means to interrupt light from the excitation light source, except for when the specimen is to be illuminated, wherein the shutter means comprises an acousto-optic element.

3. The apparatus as claimed in claim 2 further comprising second shutter means between the scanning system and the image capture device, which second shutter means is operated by signals from the control means so that in use light is prevented from reaching at least part of the image capture device, except for the specific period of time during which excitation light is incident on the specimen, for the purpose of reducing errors which arise from phosphorescence, afterglow, or stray reflections, reaching the image capture device.

4. Apparatus as claimed in claim 1 which further includes drive means adapted to move the specimen, the scanning system, or an element of an optical system within the scanning system, along a linear axis (the Z axis) so that in use a position of a scanned plane can be adjusted relative to the specimen.

5. Apparatus as claimed in claim 4 wherein in use the control means operates so as to restrict movement along the linear axis to periods during which light is prevented from reaching the image capture device.

6. Apparatus as claimed in claim 4 wherein the control means is operable to only produce movement along the linear axis during periods in which the excitation source light is inhibited or prevented from reaching the specimen.

7. Apparatus as claimed in claim 4 wherein the linear axis motion of the specimen, or scanning system, or element thereof, is continuous and wherein the apparatus further comprises means by which deconvolution is applied to re-sharpen the image at the image capture device, or an image produced by signals from the image capture device, which is otherwise blurred due to said continuous motion.

8. Apparatus as claimed in claim 1 wherein in use the wavelength of the excitation light is required to vary from one exposure to another, and the apparatus comprises two or more excitation light sources each producing excitation light of a different wavelength from the or each other source, and the control means is adapted in use to select the source to provide light of appropriate wavelength for each exposure.

9. Apparatus as claimed in claim 1 wherein in use the wavelength of the excitation light is required to vary from one exposure to another, the apparatus comprises a single source of excitation light which is adjustable to produce light of different wavelengths, and the control means is adapted to adjust the source to produce light having the required wavelength for each exposure.

10. Apparatus as claimed in claim 1 wherein the excitation light source is operable to produce light of more than one wavelength at the same time.

11. Apparatus as claimed in claim 1 wherein a single excitation light source is employed, the wavelength or wavelengths of the light emitted therefrom can be altered, and the control means is adapted to adjust the source to produce light of a desired wavelength or wavelengths,
wherein the light source is a laser light source which comprises an acousto-optical tuneable filter (AOTF) crystal, and the control means is adapted to provide signals to alter the frequency controlling signal to the crystal, to control the wavelength (or wavelengths) of the emitted light.

12. Apparatus as claimed in claim 1 wherein the excitation light source is operable so as to produce pulses of light.

13. Apparatus as claimed in claim 1 wherein the excitation light intensity is controlled by means of an attenuating element and the control means is adapted in use to control or position the attenuating element as appropriate.

14. Apparatus as claimed in claim 13 wherein the attenuating element is an AOTF or LCD shutter.

15. Apparatus as claimed in claim 1 wherein the control means is adapted to alter intensity of excitation light incident on the specimen so as to provide a predetermined intensity of illumination at the specimen for each wavelength, to remove variation in intensity from one wavelength to another as can occur due to inherent intensity variation as between one source and another or between different modes of operation of the excitation light source.

16. Apparatus as claimed in claim 1 wherein the control means is adapted to adjust power supplied to the excitation light source and/or control attenuation of light therefrom, from one exposure to another, to provide substantially constant intensity luminescence, to reduce variation in the intensity of light incident on the image capture device due to differing wavelengths of excitation light, or to render the light emitted due to luminescence of similar intensity irrespective of wavelength, or both.

17. A method of imaging light from a specimen, comprising passing excitation light to the specimen via a confocal scanning system and passing light emitted by luminescence of the specimen in another direction via the scanning system to an image capture device having a sensor having discrete spatially distinct light sensitive regions, wherein the scanning system is operated so as to scan the whole of an area of interest of the specimen, and wherein the scanning system, the excitation light and the image capture device are controlled by a controller that is programmed to function as a state machine, with the state machine controller receiving state data from a host computer, the state machine having a state counter, a state memory and a duration downcounter which receives a clock signal, so that, for each image to be formed at the image capture device, light emitted from the specimen is only incident on the image capture device sensor for a specific time period equal to that required for scanning the whole of the area of interest n times where n is a whole number equal to or greater than 1.

18. The method as claimed in claim 17 wherein shutter means is provided which operates to prevent light reaching at least part of the image capture device sensor, except for said specific period of time during which the excitation light is incident on the specimen, for the purpose of reducing errors which can arise from light arising from phosphorescence, afterglow, or stray reflections, from reaching the image capture device sensor.

19. A method as claimed in claim 17 wherein the specimen is at least in part transparent and a plurality of images are formed by scanning the specimen in a plurality of different spaced apart planes.

20. A method as claimed in claim 19 wherein the different planes are produced by relative movement between the specimen and a scanning device forming part of the scanning system.

21. A method as claimed in claim 20 wherein movement is restricted to periods during which excitation light is not incident on the specimen.

22. A method as claimed in claim 20 wherein movement is restricted to periods during which the image capture device is rendered insensitive to light.

23. A method as claimed in claim 20 wherein the movement is continuous for the purpose of speeding up the scanning of a specimen.

24. A method as claimed in claim 23 wherein the continuous movement during the imaging results in blurring of the image, and the method includes the step of applying deconvolution to re-sharpen the image.

25. A method as claimed in claim 19 wherein the different planes are produced by movement of at least one part of an optical system forming part of the scanning system so that light is brought to a focus in the specimen at different spaced apart points, each point therefore defining the position of a focal plane of the scanning system.

26. A method as claimed in claim 17 wherein the excitation light is composed of light having two or more different wavelengths.

27. A method as claimed in claim 26 wherein a single excitation light source is employed which comprises an acousto optic tuneable filter (AOTF) crystal and wavelength of the emitted light is varied by altering a frequency controlling signal to the crystal as required.

28. A method as claimed in claim 17 wherein the excitation light is pulsed.

29. A method as claimed in claim 17 wherein intensity of the incident excitation light is adjusted from one exposure to another by interposing neutral density filters, or opening or closing an iris diaphragm in a light path, adjusting power to an excitation light source, or employing an attenuating element.

30. A method as claimed in claim 17 wherein the specimen is illuminated by light at different wavelengths and the excitation light intensity is adjusted to produce a predetermined level of excitation intensity at the specimen for each wavelength.

31. A method as claimed in claim 30 wherein the adjustment produces a substantially similar level of intensity at the specimen for each different wavelength.

\* \* \* \* \*